(12) United States Patent
Sawada

(10) Patent No.: US 11,912,136 B2
(45) Date of Patent: Feb. 27, 2024

(54) CONTROL METHOD FOR ELECTRIC VEHICLE AND CONTROL DEVICE FOR ELECTRIC VEHICLE

(71) Applicant: NISSAN MOTOR CO., LTD., Yokohama (JP)

(72) Inventor: Akira Sawada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/909,185

(22) PCT Filed: Mar. 6, 2020

(86) PCT No.: PCT/JP2020/009866
§ 371 (c)(1),
(2) Date: Sep. 2, 2022

(87) PCT Pub. No.: WO2021/176730
PCT Pub. Date: Sep. 10, 2021

(65) Prior Publication Data
US 2023/0286392 A1 Sep. 14, 2023

(51) Int. Cl.
*B60L 15/20* (2006.01)
*B60L 9/18* (2006.01)

(52) U.S. Cl.
CPC ........... *B60L 15/20* (2013.01); *B60L 2240/14* (2013.01); *B60L 2240/423* (2013.01); *B60L 2240/465* (2013.01); *B60L 2250/28* (2013.01); *B60L 2260/28* (2013.01); *B60L 2260/42* (2013.01)

(58) Field of Classification Search
CPC ............... B60L 15/02; B60L 9/18; B60L 3/10
See application file for complete search history.

(56) References Cited

U.S. PATENT DOCUMENTS

| 2011/0320075 A1* | 12/2011 | Kim ................... B60W 30/192 |
| | | 180/65.265 |
| 2013/0345917 A1 | 12/2013 | Ozaki |
| 2015/0175009 A1 | 6/2015 | Beever et al. |
| 2016/0221446 A1 | 8/2016 | Suzuki et al. |

(Continued)

FOREIGN PATENT DOCUMENTS

| JP | 2012-186928 A | 9/2012 |
| JP | 2018-058584 A | 9/2012 |

(Continued)

*Primary Examiner* — Tan Q Nguyen
(74) *Attorney, Agent, or Firm* — Foley & Lardner LLP

(57) ABSTRACT

A control method of an electric vehicle using one or a plurality of motors as a traveling drive source, includes: a motor torque command value calculating step that calculates a motor torque command value; an angular velocity detecting step that detects an angular velocity correlating with a rotation speed of a drive shaft which transmits a drive force of the motor to a drive wheel; a disturbance torque estimating step that estimates a disturbance torque acting on the motor based on the motor torque command value and the angular velocity; a limiting torque setting step that sets a limiting torque corresponding to the disturbance torque in a manner that a slipping rate of the drive wheel does not exceed a first predetermined value; and a motor torque limiting step that limits the motor torque command value using the limiting torque.

8 Claims, 20 Drawing Sheets

(56) References Cited

U.S. PATENT DOCUMENTS

| | | | |
|---|---|---|---|
| 2017/0036662 A1* | 2/2017 | Chen | B60W 20/40 |
| 2018/0237023 A1* | 8/2018 | Orita | B60W 30/20 |
| 2019/0202438 A1* | 7/2019 | Park | B60W 20/13 |
| 2019/0217723 A1* | 7/2019 | Tsukashima | B60K 6/52 |
| 2019/0225086 A1* | 7/2019 | Tashiro | H01M 10/6561 |
| 2019/0381895 A1* | 12/2019 | Shindo | B60L 15/2081 |
| 2021/0086623 A1* | 3/2021 | Yao | B60W 30/18172 |

FOREIGN PATENT DOCUMENTS

| | | |
|---|---|---|
| JP | 2018-058584 A | 4/2018 |
| JP | 2020-010454 A | 1/2020 |

* cited by examiner

CONTROL METHOD FOR ELECTRIC VEHICLE AND CONTROL DEVICE FOR ELECTRIC VEHICLE

TECHNICAL FIELD

The present invention relates to a control method for an electric vehicle and a control device for an electric vehicle.

BACKGROUND ART

JP2018-058584A discloses a configuration in which an electric vehicle using a motor as a traveling drive source limits the output torque of the motor according to the friction coefficient of the traveling road to prevent slipping of the drive wheels.

SUMMARY OF INVENTION

However, since the friction coefficient fluctuates greatly depending on the road surface condition of the traveling road, it is difficult to calculate an accurate friction coefficient, and it is difficult to realize appropriate slip control.

Thus, the object of the present invention to provide a control method for an electric vehicle and a control device for the electric vehicle that realize an appropriate slip control without calculating the friction coefficient of the traveling road.

A control method of an electric vehicle according to one embodiment of the present invention is a control method of an electric vehicle using one or a plurality of motors as a traveling drive source, includes: a motor torque command value calculating step that calculates a motor torque command value; an angular velocity detecting step that detects an angular velocity correlating with a rotation speed of a drive shaft which transmits a drive force of the motor to a drive wheel; a disturbance torque estimating step that estimates a disturbance torque acting on the motor based on the motor torque command value and the angular velocity; a limiting torque setting step that sets a limiting torque corresponding to the disturbance torque in a manner that a slipping rate of the drive wheel does not exceed a first predetermined value; and a motor torque limiting step that limits the motor torque command value using the limiting torque.

DESCRIPTION OF EMBODIMENTS

Hereinafter, embodiments of the present invention will be described.

Figure 1:
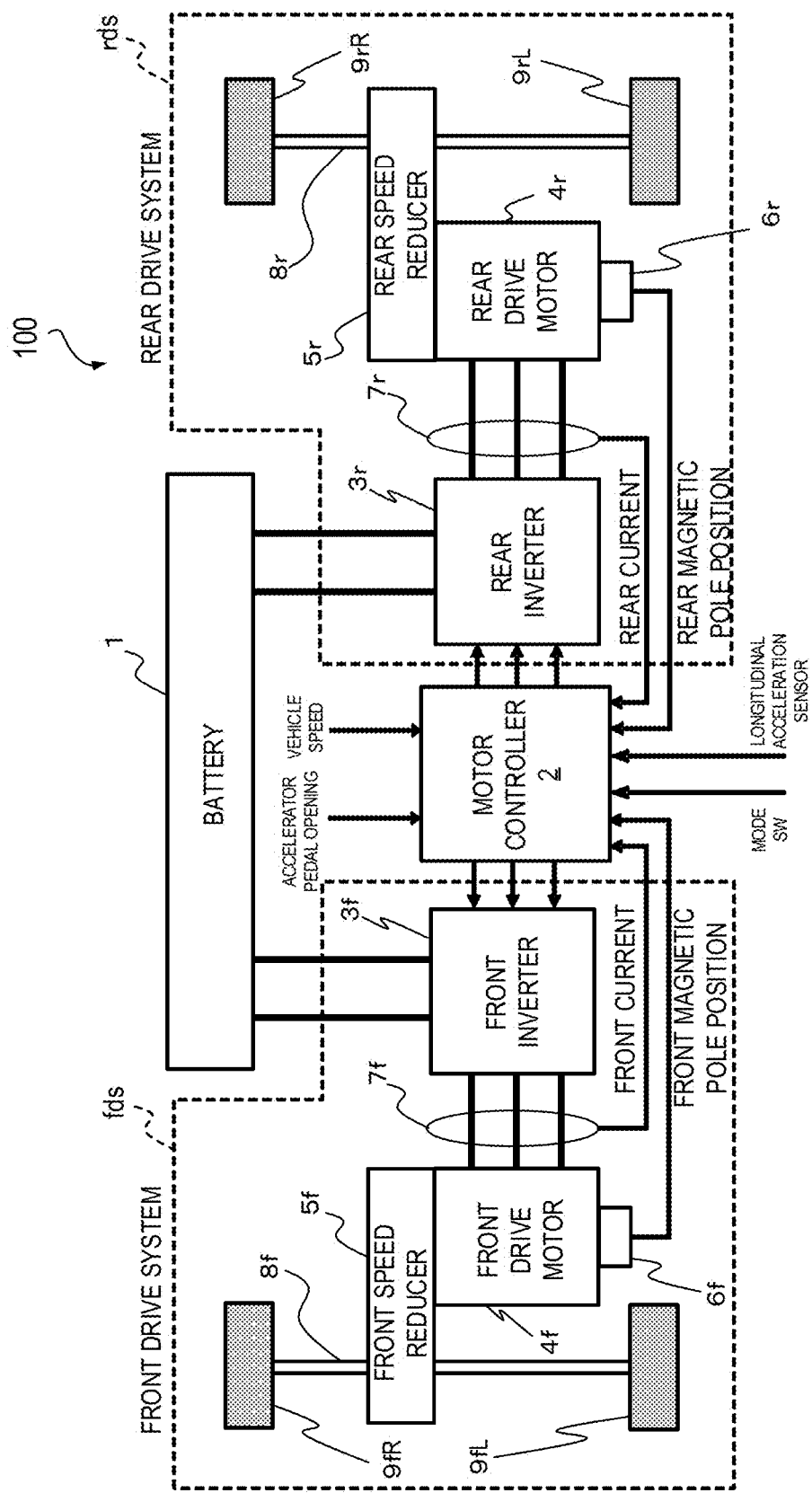
FIG. 1 is a block diagram illustrating a basic configuration of an electric vehicle control system to which the electric vehicle control method of this embodiment is applied.

FIG. 1 is a block diagram illustrating a main configuration of an electric vehicle system 100 to which the electric vehicle control method (control device) according to this embodiment is applied.

Further, the electric vehicle according to this embodiment is a vehicle including a drive motor 4 (electric motor) as a drive source of the vehicle and capable of traveling by the drive force of the drive motor 4, and includes electric vehicles and hybrid vehicles. Particularly, the electric vehicle system 100 of this embodiment applied to the electric vehicle has two drive motors 4 (a front drive motor 4*f* and a rear drive motor 4*r*). The configuration of the electric vehicle system 100 will be described in more detail below.

As shown in FIG. 1, the electric vehicle system 100 has a front drive system fds, a rear drive system rds, a battery 1, and a motor controller 2.

The front drive system fds is provided with various sensors and actuators for controlling the front drive motor 4*f* that drives the front drive wheels 9*f* (left front drive wheel 9*f*L, right front drive wheel 9*f*R).

On the other hand, the rear drive system rds is provided with various sensors and actuators for controlling the rear drive motor 4*r* that drives the rear drive wheels 9*r* (left rear drive wheel 9*r*L, right rear drive wheel 9*r*R).

Further, the front drive system fds and the rear drive system rds are individually controlled by the motor controller 2, respectively.

The battery 1 is connected to the inverters 3 (front inverter 3f, rear inverter 3r) so that the battery 1 functions as an electric power source for supplying (discharging) driving electric power to each of the drive motors 4 (front drive motor 4f, rear drive motor 4r) and meanwhile can be charged by receiving a supply of regenerative electric power from the drive motors 4 (front drive motor 4f, rear drive motor 4r), respectively.

The motor controller 2 is a computer configured of, for example, a central processing unit (CPU), a read only memory (ROM), a random access memory (RAM), and an input/output interface (I/O interface). The motor controller 2 is a component that constitutes the control device for the electric vehicle of the present invention and executes the control method for the electric vehicle of the present invention.

The motor controller 2 (motor torque command value calculating means (executes the motor torque command value calculating step), disturbance torque setting means (executes the disturbance torque setting step), limiting torque setting means (executes the limiting torque setting step), motor torque limiting means (executes the motor torque limiting step)) is input with signals of various vehicle variables indicating the vehicle state, including the accelerator pedal opening APO, the vehicle speed V, the vehicle longitudinal acceleration detected by a longitudinal acceleration sensor, the rotor phases α of the drive motors 4 (front rotor phase αf, rear rotor phase αr), and the currents Im of the drive motors 4 (front motor current Imf, rear motor current Imr), as digital signals. In addition, a signal from the mode switch (ON, OFF) that determines whether or not to execute a torque limitation process to be described later is input to the motor controller 2 based on the driver's operation.

The motor controller 2 generates a PWM signal for controlling each drive motor 4 based on the input signal. Further, the motor controller 2 generates a drive signal of each inverter 3 according to each PWM signal thus generated.

Each inverter 3 includes two switching elements (for example, power semiconductor elements, such as IGBT and MOS-FET) which are provided corresponding to each phase. Particularly, each inverter 3 converts the direct current supplied from the battery 1 to an alternating current or reversely converts an alternating current by turning on/off the switching elements in response to a command from the motor controller 2, and adjusts the current supplied to each drive motor 4 to a desired value.

Each drive motor 4 is configured as a 3-phase alternating current motor. Each drive motor 4 (front drive motor 4f, rear drive motor 4r) generates a drive force using the alternating current supplied from each corresponding inverter 3 (front inverter 3f, rear inverter 3r), and transmit the drive force to each drive wheel 9 (front drive wheel 9f, rear drive wheel 9r) via each speed reducer 5 (front speed reducer 5f, rear speed reducer 5r) and each drive shaft 8 (front drive shaft 8f, rear drive shaft 8r) corresponding to the drive force.

Further, when being rotated following the rotation of the drive wheels 9 during the travel of the vehicle, the drive motors 4 generate regenerative electric power, thereby collecting the kinetic energy of the vehicle as electrical energy. In this case, the inverters 3 convert an alternating current (regenerative electric power) generated during the regenerative operation into a direct current and supply the direct current to the battery 1.

The rotation sensors 6 (front rotation sensor 6f, rear rotation sensor 6r), which are the angular velocity detecting means (executes the angular velocity detecting step), detect the rotor phases α (front rotor phase $α_f$, rear rotor phase $α_r$) of each drive motor 4 and output them to the motor controller 2. Further, the rotation sensor 6 is configured of, for example, a resolver, an encoder, etc.

The current sensors 7 (front current sensor 7f, rear current sensor 7r) detect each 3-phase alternating current (iu, iv, iw) flowing through each drive motor 4. Further, the sum of 3-phase alternating current (iu, iv, iw) is 0, and thus, currents of any 2 phases may be detected by the current sensors 7, and current of the remaining 1 phase may be obtained by calculation. Particularly, the current sensors 7 detect a 3-phase alternating current ($iu_f$, $iv_f$, $iw_f$) that is the current flowing through the front drive motor 4f and a 3-phase alternating current ($iu_r$, $iv_r$, $iw_r$) that is the current flowing through the rear drive motor 4r. Although not illustrated, the longitudinal acceleration sensor, for example, detects an acceleration (a component of gravitational acceleration) in a predetermined direction (the direction perpendicular to the chassis of the electric vehicle).

Figure 2:
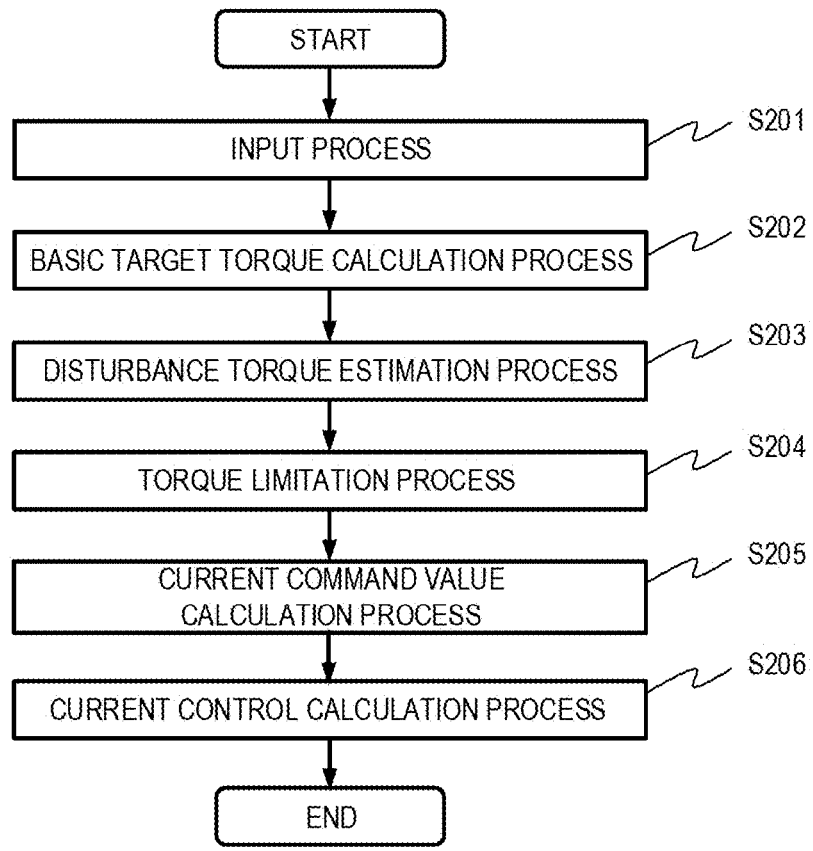
FIG. 2 is a flowchart illustrating a main process of a drive control of an electric vehicle.

FIG. 2 is a flowchart explaining the basic process in the control device of the electric vehicle executed by the motor controller 2 of this embodiment. Further, the motor controller 2 is programmed to execute the processes related to Steps S201-S206 shown in FIG. 2 in every predetermined calculation cycle.

In Step S201, the motor controller 2 performs an input process to acquire various parameters used for executing the processes from Step S202 according to the following processes 1~3.

1. Detected Value of Each Sensor

The motor controller 2 acquires the accelerator pedal opening APO (%), the rotor phase α[rad], the 3-phase alternating current (iu, iv, iw)[A] flowing through the drive motor 4, and the direct-current voltage value Vdc[V] of the battery 1 from the aforementioned unillustrated accelerator pedal opening sensor and each sensor. Further, the motor controller 2 acquires the mode switch signal (ON, OFF).

2. Previous Value of the Motor Torque Command Value $T_m$

The motor controller 2 acquires the previous values of the motor torque command values $T_m$ (front motor torque command value $T_{mf}$, rear motor torque command value $T_{mr}$) to be described later, which are stored in the internal memory.

3. Control Parameters Obtained by Calculation

The motor controller 2 calculates the motor electrical angular velocity $ω_e$ [rad/s], motor rotation speed $ω_m$ [rad/s], motor rotation number $N_m$ [rpm], and wheel speed $ω_w$ [km/h] based on each parameter acquired according to the aforementioned "1.".

(i) Motor Electrical Angular Velocity $ω_e$

The motor controller 2 obtains each motor electrical angular velocity $ω_e$ (front motor electrical angular velocity $ω_{ef}$, rear motor electrical angular velocity $ω_{er}$) by time-differentiating the rotor phase α (front rotor phase $α_f$ and rear rotor phase $α_r$).

(ii) Motor Rotation Speed $ω_m$

The motor controller 2 divides the motor electrical angular velocity $ω_e$ by the number of pole pairs of the drive motor 4 to calculate the motor rotation speed $ω_m$ (front motor rotation speed $ω_{mf}$, rear motor rotation speed $ω_{mr}$), which is the mechanical angular velocity of the drive motor 4. Further, the relation between the motor rotation speed $ω_m$ and the rotation speed of the drive shaft 8, which is the drive shaft, is appropriately determined according to the gear ratio of the speed reducer 5. That is, the motor rotation speed $\omega_m$ is a speed parameter that correlates with the rotation speed of the drive shaft 8.

(iii) Motor Rotation Number $N_m$

The motor controller 2 calculates the motor rotation number $N_m$ (front motor rotation number $N_{mf}$, rear motor rotation number $N_{mr}$) by multiplying the motor rotation speed $\omega_m$ by a unit conversion factor (60/2π).

(iv) Wheel Speed $\omega_w$

First, the motor controller 2 multiplies the front motor rotation speed $\omega_{mf}$ by the tire dynamic radius R to calculate the left front drive wheel speed $\omega_{wfL}$ and the right front drive wheel speed $\omega_{wfR}$ based on the value obtained from this multiplication and the gear ratio of the front speed reducer 5f. Further, the motor controller 2 multiplies the rear motor rotation speed $\omega_{mr}$ by the tire dynamic radius R to calculate the left rear drive wheel speed co $\omega_{wrL}$ and the right rear drive wheel speed $\omega_{wrR}$ based on the value obtained from this multiplication and the gear ratio of the final gear of the rear speed reducer 5r. Then, in this embodiment, a unit conversion factor (3600/1000) is applied to each wheel speed $\omega_w$ obtained in this way to convert the unit of the wheel speed $\omega_w$ [m/s] to [km/h].

The vehicle speed is obtained from a sensor such as GPS, or, for example, calculated as above based on a wheel speed with a rotation speed selected from the aforementioned rotation speeds $\omega_{mf}$, $\omega_{mr}$), wherein the wheel speed with the lower rotation speed is selected during acceleration, the wheel speed with the higher rotation speed is selected during deceleration, and either wheel speed is selected when traveling at almost constant speed. Further, as for the vehicle speed, the vehicle speed estimation value which is acquired using a longitudinal acceleration sensor, etc., such as the one of JP2002-127881A, may be used.

Next, in Step S202, the motor controller 2 calculates the basic target torque required by the driver based on the vehicle information.

Specifically, first, the motor controller 2 refers to the accelerator pedal opening-torque table to calculate the first torque target value $T_{m1}$ based on the accelerator pedal opening APO and the front motor rotation speed $\omega_{mf}$ (the rear motor rotation speed $\omega_{mr}$ may be used) acquired in Step S201.

Figure 3:
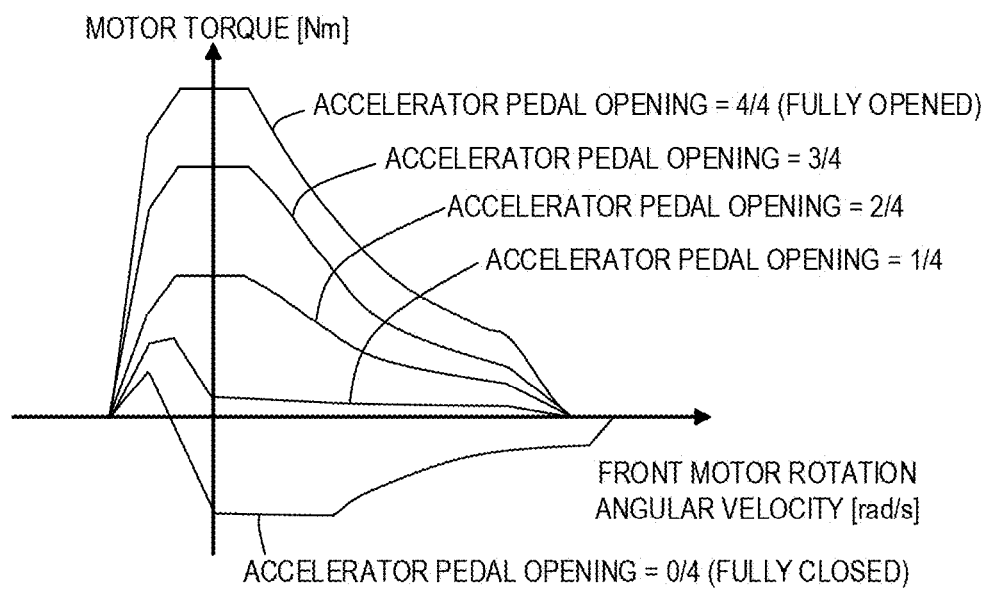
FIG. 3 is a diagram illustrating an example of an accelerator pedal opening-torque table.

FIG. 3 shows an example of the accelerator pedal opening-torque table referred to by the motor controller 2 of this embodiment.

Next, the motor controller 2 calculates the front target torque command value $T_{mfl}$ and the rear target torque command value $T_{mrl}$ according to the predetermined front-rear motor torque distribution based on the first torque target value $T_{m1}$.

Figure 4:
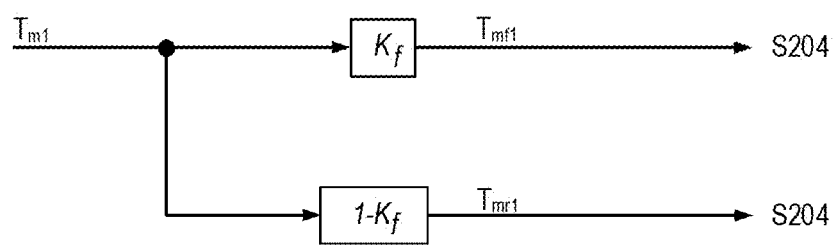
FIG. 4 is a diagram illustrating a front-rear drive force distribution process.

FIG. 4 is a diagram for explaining the front-rear drive force distribution process, and is a block diagram for explaining the calculation of the front target torque command value $T_{mfl}$ and the rear target torque command value $T_{mrl}$.

As illustrated, the motor controller 2 obtains the front target torque command value $T_{mfl}$ and the rear target torque command value $T_{mrl}$ by multiplying the first torque target value $T_{m1}$ by the front-rear drive force distribution gain Kf (0≤Kf≤1) and 1−Kf, respectively.

In Step S203, the motor controller 2 executes the disturbance torque estimation process. Specifically, the motor controller 2 is input with the front motor rotation speed $\omega_{mf}$ and rear motor rotation speed $\omega_{mr}$ acquired in Step S201, and the front motor torque command value $T_{mf}$ (previous value) and rear motor torque command value $T_{mr}$ (previous value) calculated in Step S204 (to be described later) of the previous cycle, and estimates the front disturbance torque estimation value $T_{df}$ and rear disturbance torque estimation value $T_{dr}$ by executing the disturbance torque estimation process shown in FIG. 6 to be described later. Moreover, in the disturbance torque estimation process, in addition to the front motor rotation speed $\omega_{mf}$ and rear motor rotation speed $\omega_{mr}$, rotation speeds related to the drive shaft such as the rotation speeds of the front drive wheel 9f and rear drive wheel 9r can also be applied. The details of the disturbance torque estimation process will be described later.

In Step S204, the motor controller 2 executes the torque limitation process. Specifically, the motor controller 2 limits the front motor torque command value $T_{mf}$ by the front limiting torque $T_{rf}$ calculated based on the front disturbance torque estimation value $T_{df}$ is, as shown in FIGS. 9-12 to be described later. Similarly, the rear motor torque command value $T_{mr}$ is limited by the rear limiting torque $T_{rr}$ calculated based on the rear disturbance torque estimation value $T_{dr}$. The details of the torque limitation process will be described later.

In Step S205, the motor controller 2 executes the current command value calculation process. Specifically, the motor controller 2 calculates the dq-axis current target value ($i_d^*$, $i_q^*$) by referring to the predetermined table based on the front motor torque command value $T_{mf}$, rear motor torque command value $T_{mr}$, front motor rotation speed $\omega_{mf}$, and rear motor rotation speed $\omega_{mr}$, which are calculated in Step S204, and the direct-current voltage value V ac acquired in Step S201. Especially, the motor controller 2 calculates the front dq-axis current target value ($i_{df}^*$, $i_{qf}^*$), which is the dq-axis current target value ($i_d^*$, $i_q^*$) set in the front drive motor 4f, and the rear dq-axis current target value ($i_{dr}^*$, $i_{qr}^*$), which is the dq-axis current target value ($i_d^*$, $i_q^*$) set in the rear drive motor 4r.

In Step S206, the motor controller 2 executes the current control calculation process. Specifically, the motor controller 2 first calculates the dq-axis current value ($i_d$, $i_q$) based on the 3-phase alternating current value (iu, iv, iw) and the rotor phase α acquired in Step S201. Next, the motor controller 2 calculates the dq-axis voltage command value ($v_d$, $v_q$) from the deviation between this dq-axis current value ($i_d$, $i_q$) and the dq-axis current target value ($i_d^*$, $i_q^*$) obtained in Step S205. Especially, the motor controller 2 calculates the front dq-axis voltage command value ($v_{df}$, $v_{qf}$), which is the dq-axis voltage command value ($v_d$, $v_q$) set in the front drive motor 4f, and the rear dq-axis voltage command value ($v_{dr}$, $v_{qr}$), which is the dq-axis voltage command value ($v_d$, $v_q$) set in the rear drive motor 4r.

Further, the motor controller 2 calculates the 3-phase alternating-current voltage command value (vu, vv, vw) based on the dq-axis voltage command value ($v_d$, $v_q$) and the rotor phase α. Especially, the motor controller 2 calculates the front 3-phase alternating-current voltage command value ($vu_f$, $vv_f$, $vw_f$), which is the 3-phase alternating-current voltage command value (vu, vv, vw) set in the front drive motor 4f, and the rear 3-phase alternating-current voltage command value ($vu_f$, $vv_f$, $vw_f$), which is the 3-phase alternating-current voltage command value (vu, vv, vw) set in the rear drive motor 4r.

Further, the motor controller 2 obtains a PWM signal (tu, tv, tw) [%] based on the calculated 3-phase alternating-current voltage command value (vu, vv, vw) and direct-current voltage value Vdc. By turning on and off the switching element of the inverter 3 according to the PWM signal (tu, tv, tw) obtained in this way, it is possible to drive the drive motor 4 (front drive motor 4f, rear drive motor 4r)

with the desired torque specified by the motor torque command value $T_m$ (front motor torque command value $T_{mf}$, rear motor torque command value $T_{mr}$).

<Model of the Drive Force Transmission System of the Electric Vehicle and the Transfer Characteristic Thereof>

Next, before explaining the disturbance torque estimation process (S601, S602) of the aforementioned Step S203, the details of the model of the drive force transmission system of the electric vehicle, which is the premise, and the details of each transfer characteristic based on the model will be described.

1. The Transfer Characteristic $G_{pff}(s)$ from the Front Motor Torque Command Value $T_{mf}$ to the Front Motor Rotation Speed $\omega_{mf}$ First, regarding the electric vehicle system 100, the transfer characteristic $G_{pff}(s)$ from the front motor torque command value $T_{mf}$ to the front motor rotation speed $\omega_{mf}$ will be described. This transfer characteristic $G_{pff}(s)$ is used as a vehicle model that models (simulates) the drive force transmission system of the vehicle in the disturbance torque estimation process to be described later. First, the equation of motion from the front motor torque command value $T_{mf}$ to the front motor rotation speed $\omega_{mf}$ will be explained with reference to FIG. 5.

Figure 5:
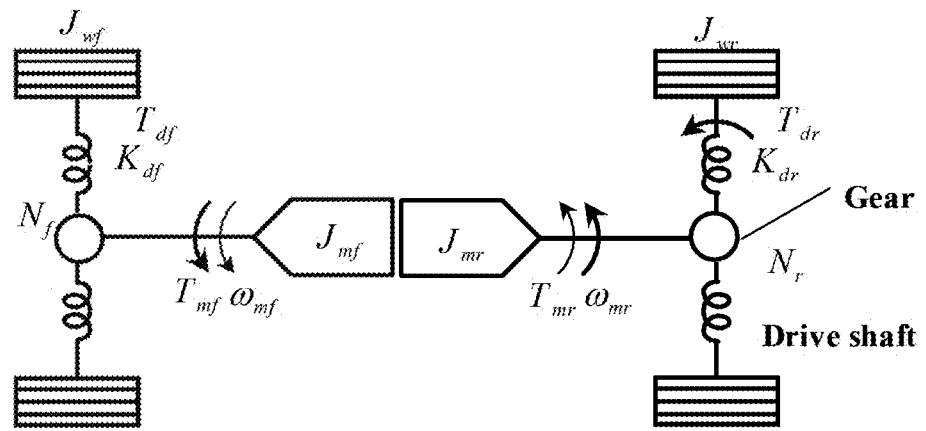
FIG. 5 is a diagram illustrating a dynamic system model of the electric vehicle including the electric vehicle control system.
Figure 5:
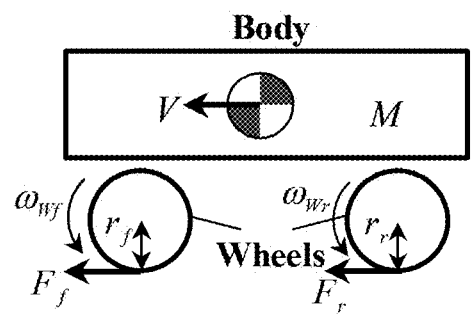

FIG. 5 is a diagram modeling a drive force transmission system of a vehicle (hereinafter, also referred to as a 4WD vehicle) related to the electric vehicle system 100. The parameters in FIG. 5 are as follows. Further, the auxiliary symbol f indicates front and r indicates rear.

$J_{mf}$, $J_{mr}$: motor inertia
$J_{wf}$, $J_{wr}$: drive wheel inertia (for one shaft)
$K_{df}$, $K_{dr}$: torsional rigidity of drive system
$K_{tf}$, $K_{tr}$: coefficient relating to friction between tires and road surface
$N_f$, $N_r$: overall gear ratio
$r_f$, $r_r$: tire load radius
$\omega_{mf}$, $\omega_{mr}$: motor rotation speed
$\hat{\omega}_{mf}$, $\hat{\omega}_{mr}$: motor rotation speed estimation value
$\theta_{mf}$, $\theta_{mr}$: motor angle
$\omega_{wf}$, $\omega_{wr}$: drive wheel angular velocity
$\theta_{wf}$, $\theta_{wr}$: drive wheel angle
$T_{mf}$, $T_{mr}$: motor torque
$T_{df}$, $T_{dr}$: drive shaft torque
$F_f$, $F_r$: drive force (for two shafts)
$\theta_{df}$, $\theta_{dr}$: torsional angle of drive shaft
V: vehicle speed
M: vehicle-body weight From FIG. 5, the equations of motion of the 4WD vehicle are represented by the following equations (1)~(11).

[Equation 1]
$$J_{mf} \cdot \dot{\omega}_{mf} = T_{mf} - T_{df}/N_f \tag{1}$$

[Equation 2]
$$J_{mr} \cdot \dot{\omega}_{mr} = T_{mr} - T_{dr}/N_r \tag{2}$$

[Equation 3]
$$2J_{wf} \cdot \dot{\omega}_{wf} = T_{df} - r_f F_f \tag{3}$$

[Equation 4]
$$2J_{wr} \cdot \dot{\omega}_{wr} = T_{dr} - r_r F_r \tag{4}$$

[Equation 5]
$$M \cdot \dot{V} = F_f + F_r \tag{5}$$

[Equation 6]
$$T_{df} = K_{df} \theta_{df} \tag{6}$$

[Equation 7]
$$T_{dr} = K_{dr} \cdot \theta_{dr} \tag{7}$$

[Equation 8]
$$F_f = K_{tf} (r_f \omega_{mf} - V) \tag{8}$$

[Equation 9]
$$F_r = K_{tr} \cdot (r_r \omega_{mr} - V) \tag{9}$$

[Equation 10]
$$\theta_{df} = \theta_{mf}/N_f - \theta_{wf} \tag{10}$$

[Equation 11]
$$\theta_{dr} = \theta_{mr}/N_r - \theta_{wr} \tag{11}$$

The transfer characteristic from the front motor torque command value $T_{mf}$ to the front motor rotation speed $\omega_{mf}$ is represented by the following equation (12) obtained by Laplace transforming the above equations (1)~(11).

[Equation 12]
$$\omega_{mf} = G_{pff}(s) \cdot T_{mf}$$
$$G_{pff}(s) = \frac{1}{s} \cdot \frac{b_6 s^6 + b_5 s^5 + b_4 s^4 + b_3 s^3 + b_2 s^2 + b_1 s + b_0}{a_6 s^6 + a_5 s^5 + a_4 s^4 + a_3 s^3 + a_2 s^2 + a_1 s + a_0} \tag{12}$$

Here, the parameters in the equation (12) are represented by the following equations (13)~(17), respectively.

[Equation 13]
$$b_6 = \chi_{21} \delta_{21}$$
$$b_5 = \chi_{11} \delta_{11} + \chi_{21} \delta_{22} + \chi_{22} \delta_{21}$$
$$b_4 = \chi_{11} \delta_{12} + \chi_{21} \delta_{23} + \chi_{22} \delta_{22} + \chi_{23} \delta_{21}$$
$$b_3 = \chi_{11} \delta_{13} + \chi_{12} \delta_{11} + \chi_{22} \delta_{23} + \chi_{23} \delta_{22} + \chi_{24} \delta_{21}$$
$$b_2 = \chi_{12} \delta_{13} + \chi_{12} \delta_{12} + \chi_{23} \delta_{23} + \chi_{24} \delta_{22}$$
$$b_1 = \chi_{12} \delta_{11} + \chi_{24} \delta_{23}$$
$$b_0 = \chi_{12} \delta_{14} \tag{13}$$

[Equation 14]
$$a_6 = \chi_{21} \delta_{41}$$
$$a_5 = \chi_{11} \delta_{31} + \chi_{22} \delta_{41} + \chi_{21} \delta_{44}$$
$$a_4 = \chi_{11} \delta_{32} + \chi_{23} \delta_{41} + \chi_{22} \delta_{42} + \chi_{21} \delta_{43}$$
$$a_3 = \chi_{12} \delta_{31} + \chi_{11} \delta_{33} + \chi_{24} \delta_{41} + \chi_{23} \delta_{42} + \chi_{22} \delta_{43} + \chi_{21} \delta_{44}$$
$$a_2 = \chi_{12} \delta_{32} + \chi_{11} \delta_{34} + \chi_{24} \delta_{42} + \chi_{23} \delta_{43} + \chi_{22} \delta_{44}$$
$$a_1 = \chi_{12} \delta_{33} + \chi_{24} \delta_{43} + \chi_{23} \delta_{44}$$
$$a_0 = \chi_{12} \delta_{34} + \chi_{24} \delta_{44} \tag{14}$$

[Equation 15]

$\chi_{11} = 2J_{wr}K_{tr}^2 r_r N_r^2 J_{mr}$ $\chi_{12} = (2J_{wr} + N_r^2 J_{mr}) K_{dr} r_r K_{tr}^2$ $\chi_{21} = 2J_{wr}K_{tr} r_r N_r^2 J_{mr}$ $\chi_{22} = K_{tr}^2 r_r^3 N_r^2 J_{mr}$ $\chi_{23} = (2J_{wr} + N_r^2 J_{mr}) K_{dr} K_{tr} r_r$ $\chi_{24} = K_{dr} K_{tr}^2 r_r^3$ (15)

[Equation 16]

$\delta_{11} = 2J_{wf} M$ $\delta_{12} = 2J_{wf} K_{tf} + K_{tf} r_f^2 M$ $\delta_{13} = K_{df} M$ $\delta_{14} = K_{df} K_{tf}$ $\delta_{21} = 2J_{wf}$ $\delta_{22} = K_{tf} r_f^2$ $\delta_{23} = K_{df}$ (16)

[Equation 17]

$\delta_{31} = N_f^2 2 J_{mf} J_{wf} M$ $\delta_{32} = N_f^2 2 J_{wf} K_{tf} J_{wf} = N_f^2 r_f^2 M K_{tf} J_{mf}$ $\delta_{33} = N_f^2 J_{mf} K_{df} M$ $\delta_{34} = 2J_{wf} K_{df} K_{tf} + N_f^2 J_{mf} K_{df} K_{tf} + r_f^2 M K_{df} K_{tf}$ $\delta_{41} = = N_f^2 2 J_{mf} J_{wf}$ $\delta_{42} = N_f^2 r_f^2 K_{tf} J_{mf}$ $\delta_{43} = 2 J_{wf} K_{df} - N_f^2 J_{mf} K_{df}$ $\delta_{44} = r_j^2 K_{df} K_{tf}$ In order to check the poles and zero points of the transfer function shown in the equation (12), the equation (12) is factorized with respect to s, thus obtaining the following equation (18).

[Equation 18]

$$G_{pff} = \frac{1}{s} \cdot M_{pff} \cdot \frac{(s+\alpha')(s+\beta')(s^2 + 2\zeta'_{pr}\omega'_{pr}s + \omega'^2_{pr})(s^2 + 2\zeta_{zf}\omega_{zf}s + \omega^2_{zf})}{(s+\alpha)(s+\beta)(s^2 + 2\zeta_{pr}\omega_{pr}s + \omega^2_{pr})(s^2 + 2\zeta_{pf}\omega_{pf}s + \omega^2_{pf})}$$ (18)

Here, "$M_{pff}$", "$\alpha$", "$\alpha'$", "$\beta$", "$\beta'$", "$\zeta_{pr}$", "$\zeta_{pr}'$", "$\omega_{pr}$", "$\omega_{pr}'$", "$\zeta_{zr}$", "$\zeta_{pf}$", "$\omega_{zf}$", and "$\omega_{pf}$" are constants that do not depend on s.

Here, "$\alpha$" and "$\alpha'$", "$\beta$" and "$\beta'$", "$\zeta_{pr}$" and "$\zeta_{pr}'$", "$\omega_{pr}$" and "$\omega_{pr}'$" in the equation (18) are values that are very close to each other. Therefore, by approximating $\alpha \approx \alpha'$, $\beta \approx \beta'$, $\zeta_{pr} \approx \zeta_{pr}'$, $\omega_{pr} \approx \omega_{pr}'$, some zero points (values of s where the numerator is 0) and some poles (values of s where the denominator is 0) are substantially equal to each other. Under this approximation, a pole-zero cancellation, which cancels out the numerator zero point terms and the denominator pole terms in the equation (18), is performed. Thereby, the transfer characteristic $G_{pff}(s)$ of (second order)/(third order) as shown in the following equation (19) can be constructed.

[Equation 19]

$$G_{pff} = \frac{1}{s} \cdot M'_{pff} \cdot \frac{(s^2 + 2\zeta_{zf}\omega_{zf}s + \omega^2_{zf})}{(s^2 + 2\zeta_{pf}\omega_{pf}s + \omega^2_{pf})}$$ (19)

Here, the "$M'_{pff}$" in the equation (19) is a constant appropriately modified from "$M_{pff}$" in consideration of the expected deviation of zero point and pole in the pole-zero cancellation based on the approximation of each of the above constants.

As a result, when checking the transfer characteristic from the front motor torque command value $T_{mf}$ to the front motor rotation speed $\omega_{mf}$ based on the equation of motion of the 4WD vehicle, $G_{pff}(s)$ can be approximated to a second order/third order equation.

Here, the model response that suppresses the torsional vibration caused by the front drive shaft 8f is set as in the following equation (20).

[Equation 20]

$$G_{rff} = \frac{1}{s} \cdot M'_{pff} \cdot \frac{(s^2 + 2\zeta_{zf}\omega_{zf}s + \omega^2_{zf})}{(s^2 + 2\omega_{pf}s + \omega^2_{pf})}$$ (20)

In this case, the feedforward compensator that suppresses the torsional vibration of the front drive system $f_{ds}$ can be represented by the following equation (21).

[Equation 21]

$$\frac{G_{rff}}{G_{pff}} = \frac{(s^2 + 2\zeta_{pf}\omega_{pf}s + \omega^2_{pf})}{(s^2 + 2\omega_{pf}s + \omega^2_{pf})}$$ (21)

2. The Transfer Characteristic $G_{prr}(s)$ from the Rear Motor Torque Command Value $T_{mr}$ to the Rear Motor Rotation Speed $\omega_{mr}$ Next, by the same method as the method for obtaining the aforementioned transfer characteristic $G_{pfr}(s)$ from the front motor torque command value $T_{mf}$ to the front motor rotation speed $\omega_{mf}$, the transfer characteristic $G_{prr}(s)$ from the rear motor torque command value $T_{mr}$ to the rear motor rotation speed $\omega_{mr}$ is obtained. This transfer characteristic $G_{prr}(s)$ is represented by the following equation (22).

[Equation 22]

$$\omega_{mr} = G_{prr}(s) \cdot T_{mr}$$

$$G_{prr} = \frac{1}{s} \cdot M'_{prr} \cdot \frac{(s^2 + 2\zeta_{zr}\omega_{zr}s + \omega^2_{zr})}{(s^2 + 2\zeta_{pr}\omega_{pr}s + \omega^2_{pr})}$$ (22)

Here, the model response that suppresses the torsional vibration caused by the rear drive shaft 8r is set as in the following equation (23).

[Equation 23]

$$G_{rrf} = \frac{1}{s} \cdot M'_{prf} \cdot \frac{(s^2 + 2\zeta_{zr}\omega_{zr}s + \omega_{zr}^2)}{(s^2 + 2\omega_{pr}s + \omega_{pr}^2)} \quad (23)$$

In this case, the feedforward compensator that suppresses the torsional vibration of the rear drive system rds can be represented by the following equation (24).

[Equation 24]

$$\frac{G_{rrr}}{G_{prr}} = \frac{(s^2 + 2\zeta_{pr}\omega_{pr}s + \omega_{pr}^2)}{(s^2 + 2\omega_{pr}s + \omega_{pr}^2)} \quad (24)$$

3. The Transfer Characteristic $G_{prf}(s)$ from the Rear Motor Torque Command Value $T_{mr}$ to the Front Motor Rotation Speed $\omega_{mf}$ The transfer characteristic $G_{prf}(s)$ from the rear motor torque command value $T_{mr}$ to the front motor rotation speed $\omega_{mf}$ is represented by the following equation (25) obtained by Laplace transforming the above equations (1)~(11).

[Equation 25]

$$\omega_{mf} = G_{prf}(s) \cdot T_{mr}$$
$$G_{prf}(s) = \frac{1}{s} \cdot \frac{b'_0}{a_6 s^6 + a_5 s^5 + a_4 s^4 + a_3 s^3 + a_2 s^2 + a_1 s + a_0} \quad (25)$$

Poles of the transfer function given by the equation (25) are checked and given by the following equation (26).

[Equation 26]

$$G_{prf} = \frac{1}{s} \cdot \frac{M_{prf}}{(s+\alpha)(s+\beta)(s^2 + 2\zeta_{pr}\omega_{pr}s + \omega_{pr}^2)(s^2 + 2\zeta_{pf}\omega_{pf}s + \omega_{pf}^2)} \quad (26)$$

Here, the poles of the equation (26) ("s=−α" and "s=−β") are located far from the origin and the dominant pole, and thus, the effect on the transfer characteristic represented by $G_{prf}(s)$ is small. Therefore, the equation (26) can be approximated to a transfer function represented by the following equation (27).

[Equation 27]

$$G_{prf} = \frac{1}{s} \cdot \frac{M'_{prf}}{(s^2 + 2\zeta_{pr}\omega_{pr}s + \omega_{pr}^2)(s^2 + 2\zeta_{pf}\omega_{pf}s + \omega_{pf}^2)} \quad (27)$$

Further, when a rear vibration damping control algorithm is considered for the vehicle model (transfer characteristic $G_{prf}(s)$) (when $\zeta_{pr}\approx 1$), a transfer function is obtained as represented by the following equation (28).

[Equation 28]

$$G_{prf} = \frac{1}{s} \cdot \frac{M'_{prf}}{(s^2 + 2\omega_{pr}s + \omega_{pr}^2)(s^2 + 2\zeta_{pf}\omega_{pf}s + \omega_{pf}^2)} \quad (28)$$

Further, the transfer function, which is for suppressing the torsional vibration of the front drive system fds from a model response of a front motor rotation speed estimation value $\omega^{\wedge}_{mf}$ of the front drive system fds, is represented by the following equation (29).

[Equation 29]

$$G_{rrf} = \frac{1}{s} \cdot \frac{M'_{prf}}{(s^2 + 2\omega_{pr}s + \omega_{pr}^2)(s^2 + 2\omega_{pf}s + \omega_{pf}^2)} \quad (29)$$

<Disturbance Torque Estimation Process>

Figure 6:
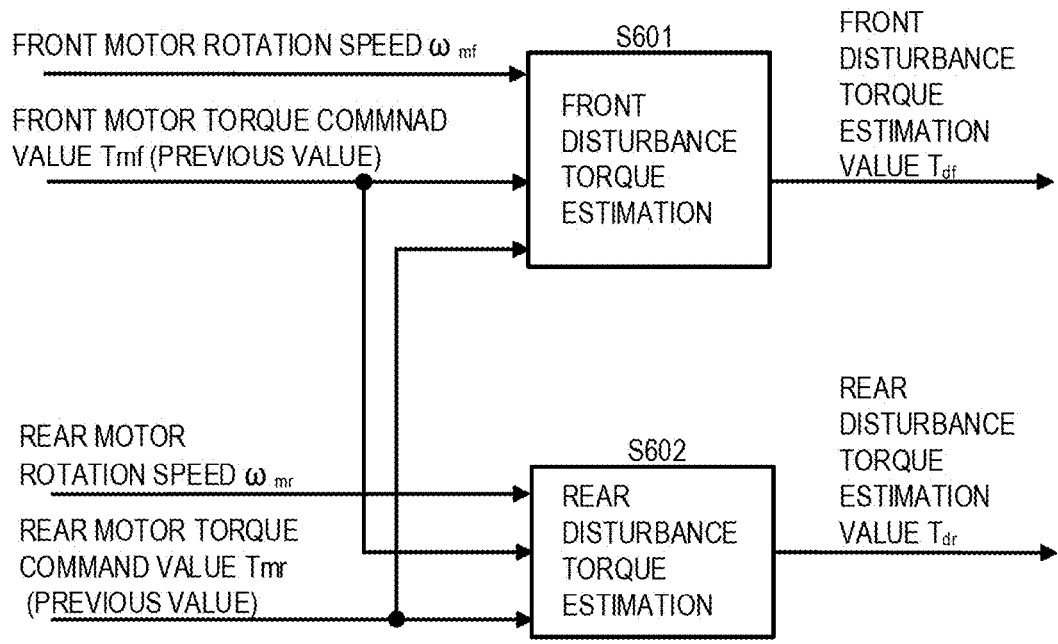
FIG. 6 is a block diagram illustrating a disturbance torque estimation process.
Figure 7:
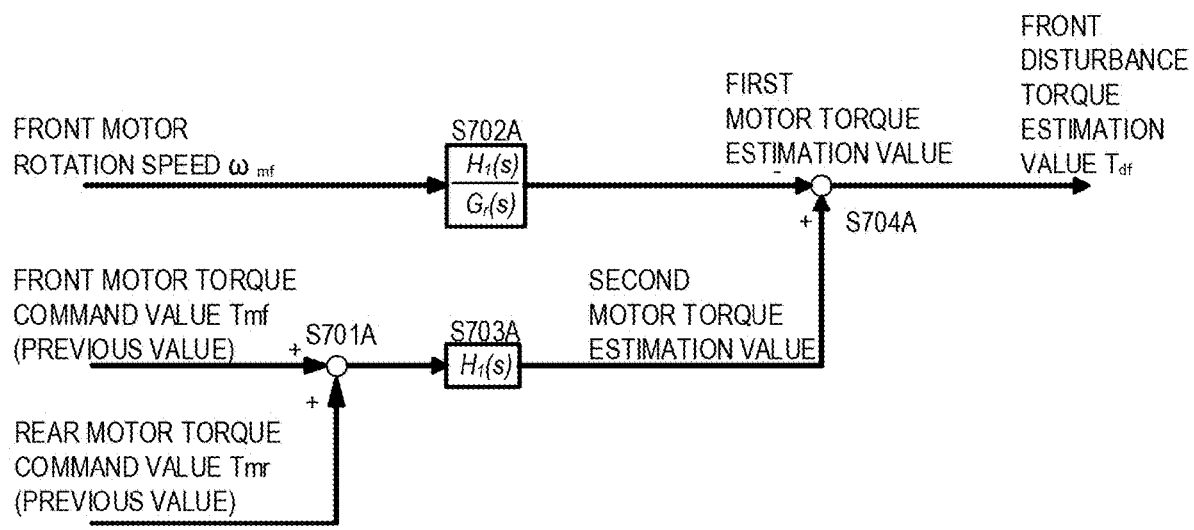
FIG. 7 is a block diagram illustrating a front disturbance torque estimation process.
Figure 8:
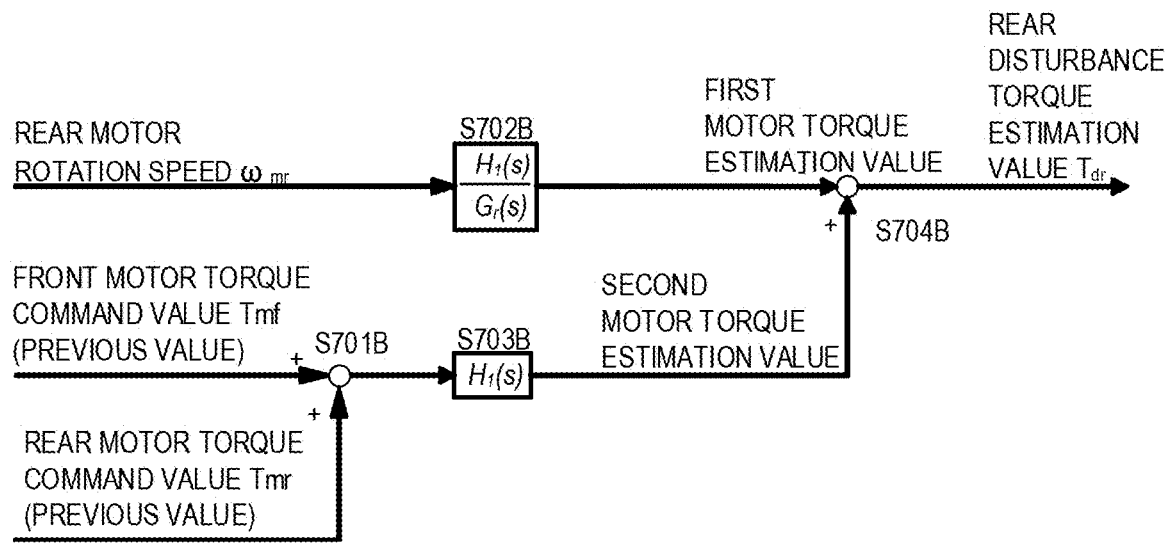
FIG. 8 is a block diagram illustrating a rear disturbance torque estimation process.

The disturbance torque estimation process shown in Step 203 of FIG. 2 will be described in detail below. FIG. 6 is a block diagram illustrating the disturbance torque estimation process. FIG. 7 is a block diagram illustrating the front disturbance torque estimation process. FIG. 8 is a block diagram illustrating the rear disturbance torque estimation process.

As shown in FIG. 6, in Step S601, the motor controller 2 estimates the front disturbance torque estimation value $T_{df}$ based on the front motor rotation speed $\omega_{mf}$, front motor torque command value $T_{mf}$ (previous value), and rear motor torque command value $T_{mr}$ (previous value).

Specifically, as shown in FIG. 7, in Step S701A, the motor controller 2 calculates the total torque command value of the entire electric vehicle by adding the front motor torque command value $T_{mf}$ (previous value) and the rear motor torque command value $T_{mr}$ (previous value).

Further, if there are differences between the front side parameters and the rear side parameters to the extent that the differences can affect the calculation of the appropriate disturbance torque estimation value (front disturbance torque estimation value $T_{df}$, rear disturbance torque estimation value $T_{dr}$), like a case where the gear ratios of the front speed reducer 5f and the rear speed reducer 5r or the tire dynamic radiuses of the front drive wheels 9f and the rear drive wheels 9r are different from each other, a gain may be set in consideration of these differences as appropriate. For example, the total torque command value may be obtained after multiplying the rear motor torque command value $T_{mr}$ (previous value) by the gain which is used for the conversion to the front motor torque conversion value.

Next, in Step S702A, the motor controller 2 calculates the first motor torque estimation value by applying the filtering process according to the transfer function $(H_1(s)/G_r(s))$ to the front motor rotation speed $\omega_{mf}$.

Here, the vehicle responsiveness $G_r(s)$ constituting the numerator of the aforementioned transfer function is a function set as the $G_{rrf}(s)$ of the equation (21), and is set as shown in the following equation (30) using the equivalent mass $M_V$ obtained from the vehicle-body mass M, front motor inertia $J_{mf}$, rear motor inertia $J_{mr}$, front drive wheel inertia $J_{wf}$, and rear drive wheel inertia $J_{wr}$.

[Equation 30]

$$G_r(s) = \frac{K_M}{M_V s} \quad (30)$$

$$M_V = M + \frac{2J_{wf}}{r_f^2} + \frac{2J_{wr}}{r_r^2} + \frac{J_{mf}N_f^2}{r_f^2} + \frac{J_{mr}N_r^2}{r_r^2}$$

$$K_M = \frac{N_f^2}{r_f^2}$$

On the other hand, the low pass filter $H_1(s)$, which constitutes the denominator of the aforementioned transfer function, is a low-pass filter having a transfer characteristic such that the difference between the denominator order and the numerator order is equal to or greater than the difference between the denominator order and the numerator order of the vehicle responsiveness $G_r(s)$. More specifically, the low pass filter $H_1(s)$ is represented by the following equation (31).

[Equation 31]

$$H_1(s) = \frac{1}{\tau_V s + 1} \quad (31)$$

Next, in Step S703A, the motor controller 2 calculates the second motor torque estimation value by filtering the total torque command value calculated in the aforementioned Step S701 using the low pass filter H1(s) of the equation (31).

Then, in Step S704A, the motor controller 2 obtains the front disturbance torque estimation value $T_{df}$ by calculating the deviation between the first motor torque estimation value obtained in Step S702A and the second motor torque estimation value obtained in Step S703A.

Here, as the disturbances acting on the electric vehicle, modeling error, rolling resistance of tire, gradient resistance, etc. due to traveling resistance such as sand, air resistance, and fluctuation of vehicle mass (number of occupants, load capacity) are considered. The disturbance factors differ depending on the operating conditions, but in the disturbance torque estimation process (Step S601, Step S602), the front disturbance torque estimation value $T_{df}$ (and the rear disturbance torque estimation value $T_{dr}$ to be described below) is calculated based on the front motor torque command value $T_{mf}$ (previous value), rear motor torque command value $T_{mr}$ (previous value), front motor rotation speed $\omega_{mf}$, equivalent mass MV, and vehicle model (H1(s)/Gr(s)), and thus, the disturbance factors can be estimated collectively. As a result, it is possible to accurately estimate traveling resistance such as resistance due to sand.

Further, as shown in FIG. 6, in Step S602, the motor controller 2 estimates the rear disturbance torque estimation value $T_{dr}$ based on the rear motor rotation speed $\omega_{mr}$, front motor torque command value $T_{mf}$ (previous value), and rear motor torque command value $T_{mr}$ (previous value).

As shown in FIG. 7, the motor controller 2 estimates the rear disturbance torque estimation value $T_{dr}$ by performing the processes of Step S701B, Step S702B, Step S703B, and Step S704B.

Here, Step S701B is the same as Step S701A of FIG. 7. Step S702B is similar to Step S702A of FIG. 7, but the target of filtering is the rear motor rotation speed $\omega_{mr}$, and Gr(s) is a function set as $G_{rrr}(s)$ in the equation (24), and in the equation (30), $K_M = N_r^2/r_r^2$. Step S703B is the same as Step S703A of FIG. 7. Step S704B is similar to Step S704A, but the first torque motor value is the filtered rear motor rotation speed $\omega_{mr}$.

As above, the disturbance torque received from the road surface can be estimated independently with regard to the front drive motor 4f (FIG. 1) and the rear drive motor 4r (FIG. 1) using the front motor rotation speed $\omega_{mf}$, rear motor rotation speed $\omega_{mr}$, front motor torque command value $T_{mf}$ (previous value), and rear motor torque command value $T_{mr}$ (previous value).

<Torque Limitation Process>

Figure 9:
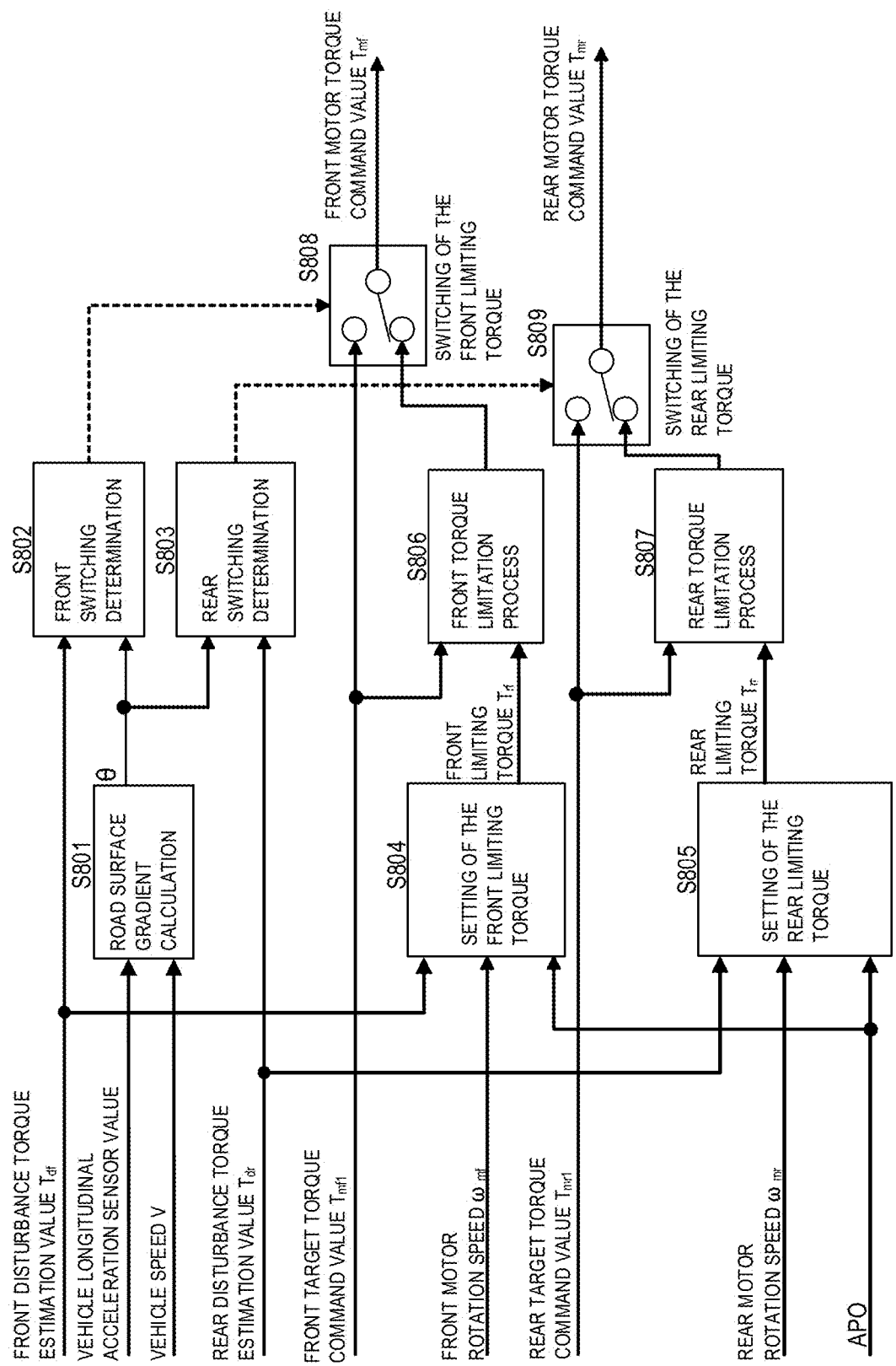
FIG. 9 is a block diagram illustrating a torque limitation process.

The torque limitation process shown in Step S204 (FIG. 2) will be described in detail below. FIG. 9 is a block diagram illustrating the torque limitation process.

As shown in FIG. 9, in the torque limitation process, the front motor torque command value $T_{mf}$ and the rear motor torque command value $T_{mr}$ are calculated by performing the processes of Step S801 to Step S809 based on the vehicle longitudinal acceleration sensor value, vehicle speed V, front disturbance torque estimation value $T_{df}$, rear disturbance torque estimation value $T_{dr}$, front target torque command value $T_{mfl}$, rear target torque command value $T_{mrl}$, front motor rotation speed $\omega_{mf}$, rear motor rotation speed $\omega_{mr}$, and accelerator pedal opening APO.

In the road surface gradient calculation process of Step S801, the motor controller 2 calculates and outputs the gradient θ of the road surface based on the vehicle longitudinal acceleration sensor value and the vehicle speed V. The gradient θ of the road surface is calculated according to the difference between the acceleration obtained by differentiating the vehicle speed V and the vehicle longitudinal acceleration sensor value.

In the front switching determination process of Step S802, the motor controller 2 outputs a switching signal based on the front disturbance torque estimation value $T_{df}$, the gradient θ calculated in Step S801, etc. Further, the details of the front switching determination process of Step S802 will be described later (see FIG. 10).

In the rear switching determination process of Step S803, the motor controller 2 sets the switching flag based on the rear disturbance torque estimation value $T_{dr}$, the gradient θ, etc. calculated in Step S801. Further, the switching determination processes of Step S802 and Step S803 are executed in a manner that the determinations are the same for each other.

In the front limiting torque setting process of Step S804, the motor controller 2 calculates the front limiting torque $T_{rf}$ based on the front disturbance torque estimation value $T_{df}$, front motor rotation speed $\omega_{mf}$, and accelerator pedal opening APO. The details of the front limiting torque setting process of Step S804 will be described later (see FIG. 11).

In the rear limiting torque setting process of Step S805, the motor controller 2 calculates the rear limiting torque $T_{rr}$ based on the rear disturbance torque estimation value $T_{dr}$, rear motor rotation speed $\omega_{mr}$, and accelerator pedal opening APO. The details of the rear limiting torque setting process of Step S805 will be described later (see FIG. 12).

In the front torque limitation process of Step S806, the motor controller 2 compares the front target torque command value $T_{mfl}$ with the front limiting torque $T_{rf}$ calculated in Step S804, and selects the one with the smaller value to output.

In the rear torque limitation process of Step S807, the motor controller 2 compares the rear target torque command value $T_{mrl}$ with the rear limiting torque $T_{rr}$ calculated in Step S805, and selects the one with the smaller value to output.

In the front torque switching process of Step S808, the motor controller 2 selects the front target torque command value $T_{mfl}$ when the switching flag output in Step S802 is OFF (0), and outputs the front target torque command value $T_{mfl}$ as the front motor torque command value $T_{mf}$. In addition, the motor controller 2 selects the output of the front torque limitation process of Step S806 when the switching flag output in Step S802 is ON (1), and outputs the output of the front torque limitation process of Step S806 as the front motor torque command value $T_{mf}$. In other words, when the switching signal is an ON signal, the output of the front torque limitation process, that is, the smaller of the front target torque command value $T_{mfl}$ and the front limiting torque $T_{rf}$, is output as the front motor torque command value $T_{mf}$.

In the rear torque switching process of Step S809, the motor controller 2 selects the rear target torque command value $T_{mrl}$ when the switching flag output in Step S803 is OFF (1), and outputs the rear target torque command value $T_{mrl}$ as the rear motor torque command value $T_{mr}$. In addition, the motor controller 2 selects the output of the rear torque limitation process of Step S807 when the switching flag output in Step S803 is ON (1), and outputs the output of the rear torque limitation process of Step S807 as the rear motor torque command value $T_{mr}$. In other words, when the switching signal is ON (1), the output of the rear torque limitation process, that is, the smaller of the rear target torque command value $T_{mrl}$ and the rear limiting torque $T_{rr}$, is output as the rear motor torque command value $T_{mr}$.

By executing the aforementioned torque limitation process, it is possible to perform a torque control that suppresses subsidence (being stuck), acceleration failure and over-rotation in sand, etc. for a 4WD vehicle as described below.

<Front Switching Determination Process>

Figure 10:
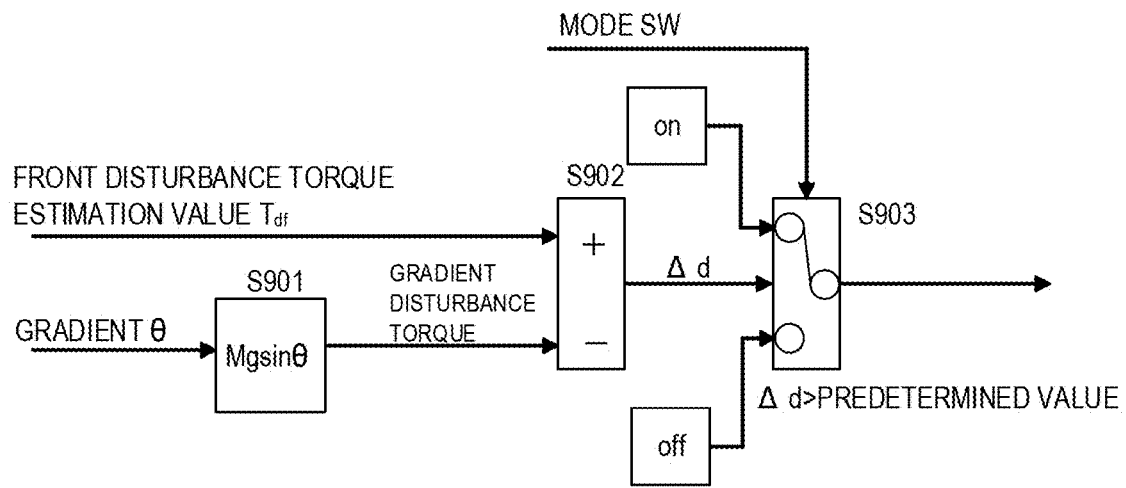
FIG. 10 is a block diagram illustrating a front switching determination process.

The details of the front switching determination process of Step S802 (FIG. 9) will be described below. FIG. 10 is a block diagram illustrating the front switching determination process.

In the front switching determination process, the switching flag is set by performing the processes of Steps S901 to S903 based on the front disturbance torque estimation value $T_{df}$, gradient θ, and mode switch.

In Step S901, the motor controller 2 calculates the gradient disturbance torque (Mg sin θ) balanced by the road surface gradient based on the gradient θ and the vehicle-body mass M.

In Step S902, the motor controller 2 removes the gradient disturbance torque included in the front disturbance torque estimation value $T_{df}$ to calculate the traveling resistance Δd of sand, etc. by subtracting the gradient disturbance torque calculated in Step S901 from the front disturbance torque estimation value $T_{df}$.

In Step S903, when the traveling resistance Δd is larger than the second predetermined value (which can be arbitrarily set), the motor controller 2 determines that the sand resistance or the like is larger than the normal road surface resistance, and sets the switching flag to ON (1). In addition, the motor controller 2 sets the switching flag to OFF (0) when the traveling resistance Δd is equal to or less than the second predetermined value. Moreover, regardless of the traveling resistance Δd, the motor controller 2 can also set the switching flag to ON (1) when the mode switch is ON and set the switching flag to OFF (0) when the mode switch is OFF according to the driver's switch operation.

Further, although not illustrated, in the rear switching determination process of Step S803, the switching flag is set by performing the same processes as Steps S901 to S903 based on the rear disturbance torque estimation value $T_{dr}$, gradient θ, and mode switch.

<Front Limiting Torque Setting Process>

Figure 11:
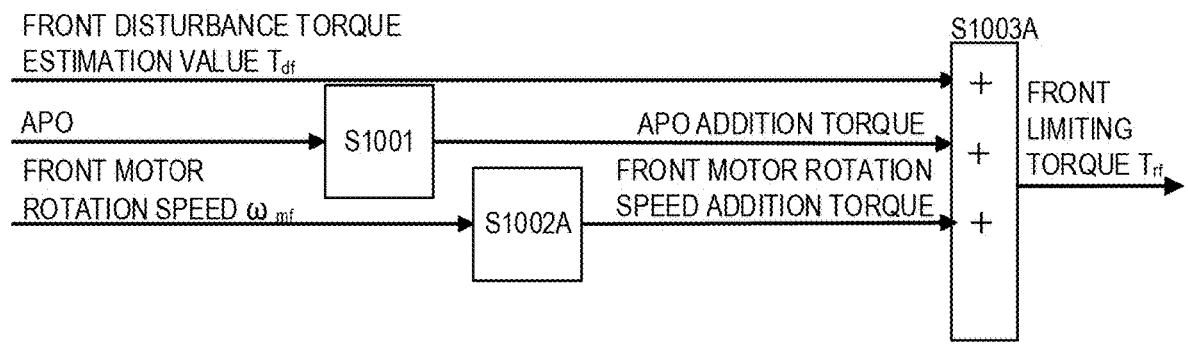
FIG. 11 is a block diagram illustrating a front limiting torque setting process.
Figure 13:
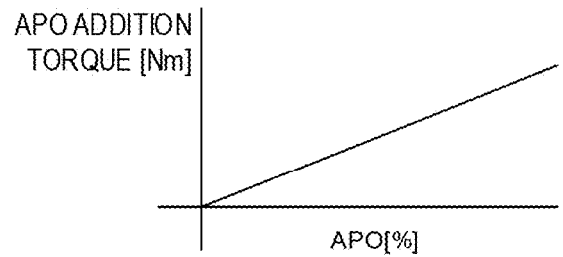
FIG. 13 is a diagram illustrating a map for setting an accelerator pedal opening addition torque.
Figure 15:
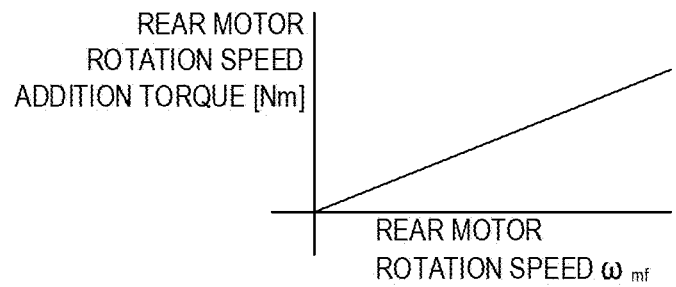
FIG. 15 is a diagram illustrating a map for setting a rear motor rotation speed addition torque.

The details of the front limiting torque setting process of Step S804 (FIG. 9) will be described below. FIG. 11 is a block diagram illustrating the front limiting torque setting process. FIG. 13 is a diagram illustrating a map for setting an accelerator pedal opening addition torque. FIG. 15 is a diagram illustrating a map for setting a rear motor rotation speed addition torque.

As shown in FIG. 11, in the front limiting torque setting process, the front limiting torque $T_{rf}$ is calculated by performing the processes of Step S1001, Step S1002A, and Step S1003A based on the front disturbance torque estimation value $T_{df}$, front motor rotation speed $ω_{mf}$, and accelerator pedal opening APO.

In Step S1001, the motor controller 2 sets the APO addition torque corresponding to the accelerator pedal opening APO using the map shown in FIG. 13. The map shown in FIG. 13 illustrates that the APO addition torque increases linearly with the increase of the accelerator pedal opening APO, but the relation may also be a curve in which the APO addition torque increases monotonically with the increase of the accelerator pedal opening APO. Further, the APO addition torque can also be set to a constant value regardless of the size of the accelerator pedal opening APO.

Figure 14:
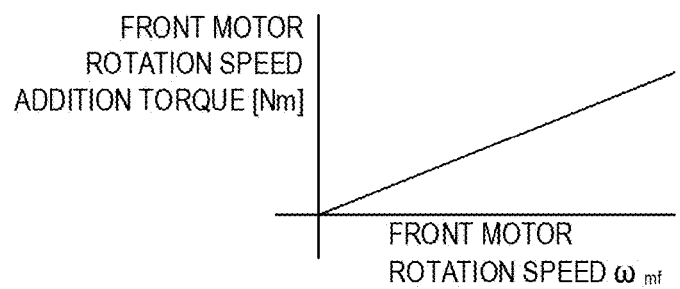
FIG. 14 is a diagram illustrating a map for setting a front motor rotation speed addition torque.

In Step S1002A, the motor controller 2 sets the front motor rotation speed addition torque corresponding to the front motor rotation speed $ω_{mf}$ using the map shown in FIG. 14. Similar to the above, the map shown in FIG. 14 illustrates that the front motor rotation speed addition torque increases linearly with the increase of the front motor rotation speed $ω_{mf}$, but as described above, the relation may be a curve of monotonical increase, or may be set to a constant value.

In Step S1003A, the motor controller 2 calculates and outputs the front limiting torque $T_{rf}$ by adding the addition torque (APO addition torque and front motor rotation speed addition torque) to the front disturbance torque estimation value $T_{df}$. Here, the front limiting torque $T_{rf}$ is higher than the front disturbance torque estimation value $T_{df}$ by the addition torque, but the slipping rate of the front drive wheel 9f, for example, can be set to be in the range of 10% to 20%, and can be set in a manner that the slipping rate of the front drive wheel 9f does not exceed the first predetermined value (for example, 20%) (in the characteristic curve showing the relation between the slipping rate and the longitudinal frictional force of the drive wheel 9, the slipping rate does not exceed the slipping rate near the peak value of the longitudinal frictional force). Thereby, as long as the front motor torque command value $T_{mf}$ is set to the front limiting torque $T_{rf}$, the front drive wheel 9f can apply longitudinal acceleration to the electric vehicle regardless of the road surface condition.

<Rear Limiting Torque Setting Process>

Figure 12:
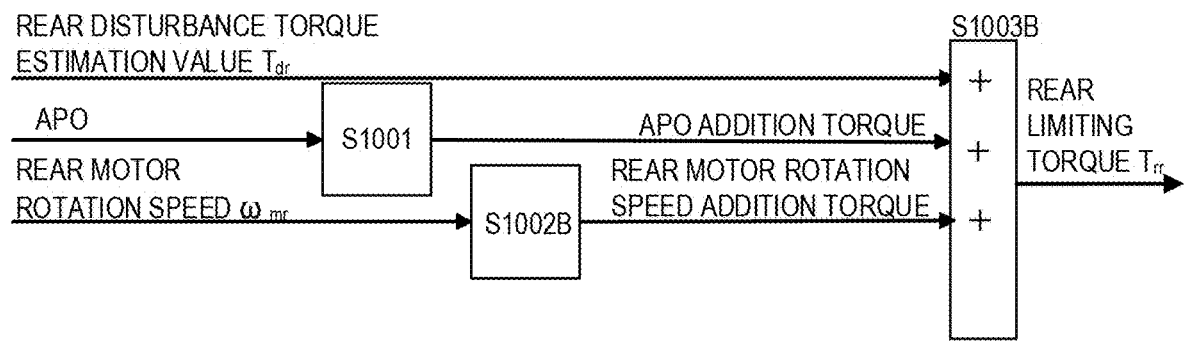
FIG. 12 is a block diagram illustrating a rear limiting torque setting process.

The details of the rear limiting torque setting process of Step S805 (FIG. 9) will be described below. FIG. 12 is a block diagram illustrating the rear limiting torque setting process. FIG. 15 is a diagram illustrating a map for setting a rear motor rotation speed addition torque.

As shown in FIG. 12, in the rear limiting torque setting process, the rear limiting torque $T_{rr}$ is calculated by performing the processes of Step S1002B and Step S1003B in addition to the aforementioned Step S1001 based on the rear disturbance torque estimation value $T_{dr}$, rear motor rotation speed $ω_{mr}$, and accelerator pedal opening APO. Here, Step S1002B is similar to Step S1002A of FIG. 11, but the rear motor rotation speed addition torque is set based on the map shown in FIG. 15 (preferably the same as the map shown in FIG. 14) in the same manner as the setting of the aforementioned front motor rotation speed addition torque using the rear motor rotation speed $ω_{mr}$ as the input value. Step S1003B is similar to Step S1003A of FIG. 11, but the rear limiting torque $T_{rr}$ is calculated and output by adding the addition torque (APO addition torque and rear motor rotation speed addition torque) to the rear disturbance torque estimation value $T_{dr}$. Similar to the above, as long as the rear motor torque command value $T_{mr}$ is set to the rear limiting torque $T_{rr}$, the rear drive wheel 9r can apply longitudinal acceleration to the electric vehicle regardless of the road surface condition.

<Time Chart of this Embodiment>

The operation when the electric vehicle is driven by the control method (control device) of the electric vehicle of this embodiment will be described.

[When the Accelerator is Depressed Slowly]

Figure 16:
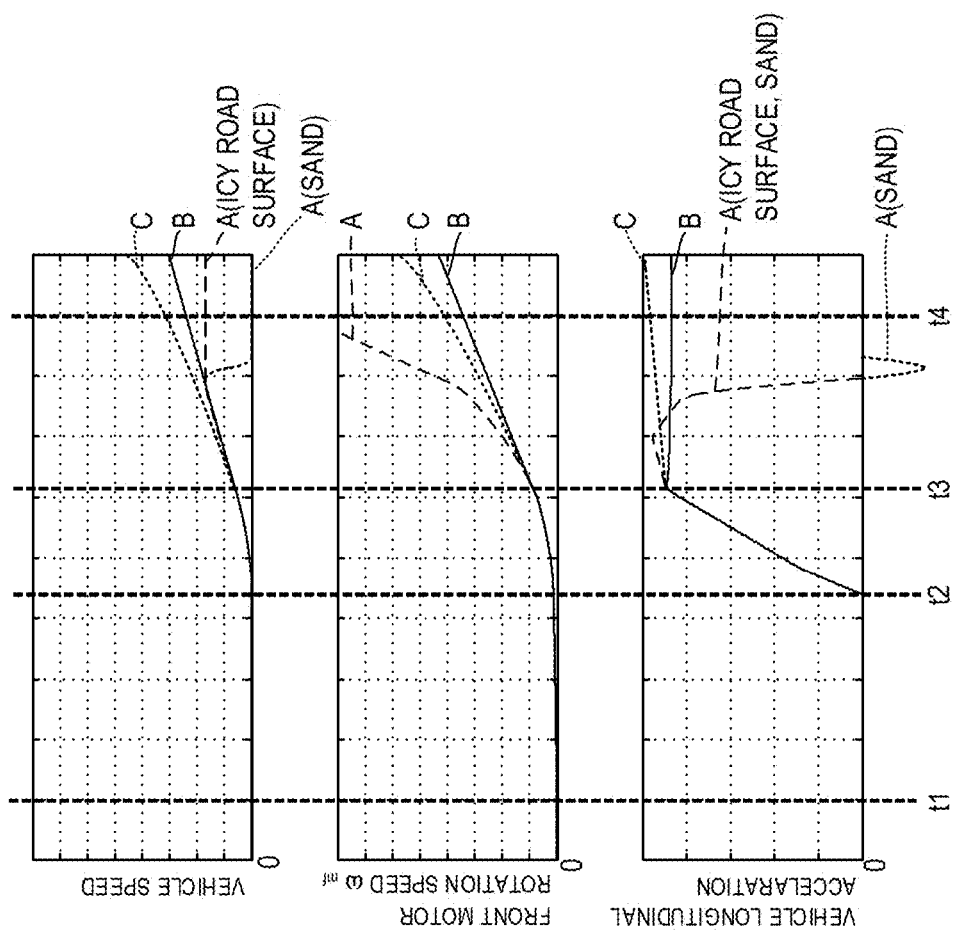
FIG. 16 illustrates the drive control of the electric vehicle according to the control method of this embodiment, and is a time chart when the accelerator is slowly depressed to start the electric vehicle from a stopped state.
Figure 16:
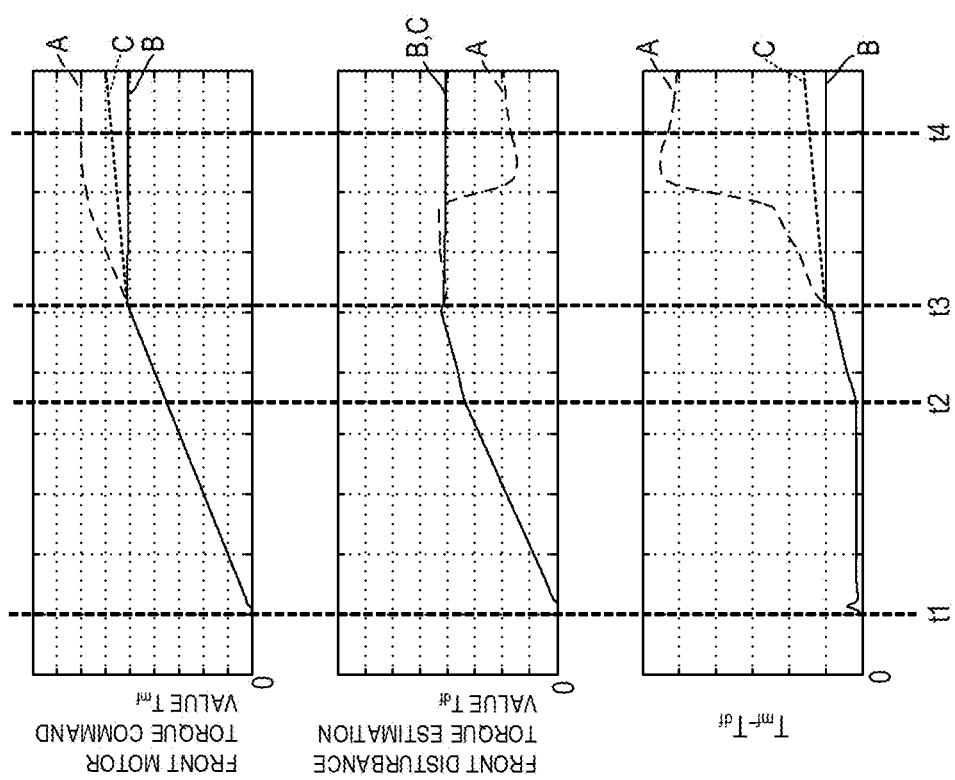

FIG. 16 illustrates the drive control of the electric vehicle according to the control method of this embodiment, and is a time chart when the accelerator is slowly depressed to start the electric vehicle from a stopped state. In FIG. 16, it is assumed that the accelerator is first depressed from the time t1 and the desired depression amount is reached between the time t1 and the time t4.

In FIG. 16 (the same applies to FIG. 17 and FIG. 18 to be described later), (A) is the time chart when the prior art is applied, (B) is the time chart when the addition torque is fixed to the first predetermined value in this embodiment, and (C) is the time chart when the addition torque is set corresponding to the accelerator pedal opening APO and the front motor rotation speed $\omega_{mf}$ in this embodiment. Further, although the time chart on the rear motor side is omitted, the operation is the same as that of the time chart on the front motor side.

At the time t1, when the driver depresses the accelerator, the front motor torque command value $T_{mf}$ (torque that drives the front drive wheel 9f) increases, and following this, the front disturbance torque estimation value $T_{df}$ (torque that brakes the front drive wheel 9f) also increases, and the relation of $T_{mf}=T_{df}$ is satisfied until time t2. Therefore, $T_{mf}-T_{df}$ remains almost zero, the vehicle speed, front motor rotation speed $\omega_{mf}$, and vehicle longitudinal acceleration also remain zero, and the electric vehicle remains stopped.

From the time t2 to t3, the front motor torque command value $T_{mf}$ becomes larger than the front disturbance torque estimation value $T_{df}$. Thereby, $T_{mf}-T_{df}$ starts to increase, the vehicle speed, front motor rotation speed $\omega_{mf}$, and vehicle longitudinal acceleration also start to increase, and the electric vehicle starts to travel.

In the case of (A), from the time t3 to t4, as the front motor torque command value $T_{mf}$ continues to increase based on the accelerator pedal opening APO, the difference between the front motor torque command value $T_{mf}$ and the front disturbance torque estimation value $T_{df}$ increases, and the slipping rate of the drive wheel 9 increases. Further, when the slipping rate exceeds the first predetermined value (for example, 20%), the frictional force in the longitudinal direction of the vehicle with respect to the drive wheel 9 decreases, and thus, the front disturbance torque estimation value $T_{df}$ decreases. For this reason, since the slipping rate increases sharply, the front motor rotation speed $\omega_{mf}$ increases sharply (over-rotation state), while the vehicle longitudinal acceleration decreases sharply, resulting in acceleration failure, and the vehicle speed does not increase, either.

Here, regarding (A), when the traveling road surface has a significantly low traveling resistance, like icy road surface, etc., if the longitudinal angular velocity of the vehicle becomes zero, the front drive wheel 9f rotates while the vehicle longitudinal acceleration remains almost zero, and the vehicle speed is also almost constant. Further, when the traveling road surface is sand, if the vehicle longitudinal acceleration becomes zero, the vehicle speed decreases sharply to zero, the vehicle longitudinal acceleration also converges to zero after once becoming negative, the front drive wheel 9f rotates but sinks (becomes stuck) in the sand, and the electric vehicle cannot move forward (the state where the sand is only scraped backward).

In the case of (B), from the time t3 to t4, the front motor torque command value $T_{mf}$ is limited in a manner that $T_{mf}-T_{df}$ does not exceed the addition torque. At this time, the slipping rate is maintained in a state of not exceeding the first predetermined value (for example, 20%), and thus, there is almost no decrease in the front disturbance torque estimation value $T_{df}$, and the front motor torque command value $T_{mf}$ remains a predetermined value. Therefore, the front motor rotation speed $\omega_{mf}$ continues to increase, but the vehicle longitudinal acceleration remains an almost constant value, and the vehicle speed also continues to increase. Thus, in the case of (B), it is possible to increase the vehicle speed at a predetermined acceleration without the front drive wheel 9f being stuck.

In the case of (C), from the time t3 to t4, the front motor torque command value $T_{mf}$ is also limited in a manner that $T_{mf}-T_{df}$ does not exceed the addition torque. Here, the addition torque is set to increase with the increase of the accelerator pedal opening APO and/or the front motor rotation speed $\omega_{mf}$. Thus, for example, as the front motor rotation speed $\omega_{mf}$ increases, $T_{mf}-T_{df}$ gradually increases, and along with this, the front motor torque command value $T_{mf}$ also gradually increases. Therefore, the front motor rotation speed $\omega_{mf}$ has a higher increasing speed than in the case of (B).

On the other hand, the slipping rate is maintained in a state of not exceeding the first predetermined value (for example, 20%), and thus, in the state that there is almost no decrease in the front disturbance torque estimation value $T_{df}$, it is possible to gradually increase the front motor torque command value $T_{mf}$. Therefore, it is possible to control to gradually increase the vehicle longitudinal acceleration, and the vehicle speed can also be increased faster than in the case of (B).

Thus, in the case of (C), it is possible to increase the vehicle speed at the desired acceleration based on the accelerator pedal opening APO, and/or the front motor rotation speed $\omega_{mf}$ without the front drive wheel 9f being stuck, and the vehicle speed can be increased faster than in the case of (B).

In either case of (B) and (C), by adding the addition torque to the disturbance torque estimation value (front disturbance torque estimation value $T_{df}$, rear disturbance torque estimation value $T_{dr}$) to limit the torque command value (front target torque command value $T_{mfl}$, rear target torque command value $T_{mrl}$) by the driver's accelerator operation, it is possible to limit the motor torque command value (front motor torque command value $T_{mf}$, rear motor torque command value $T_{mr}$) according to the road surface disturbance, and the target acceleration can be obtained without the front drive wheel 9f and rear drive wheel 9r (FIG. 1) sinking into sand, etc.

[When the Accelerator is Depressed Quickly]

Figure 17:
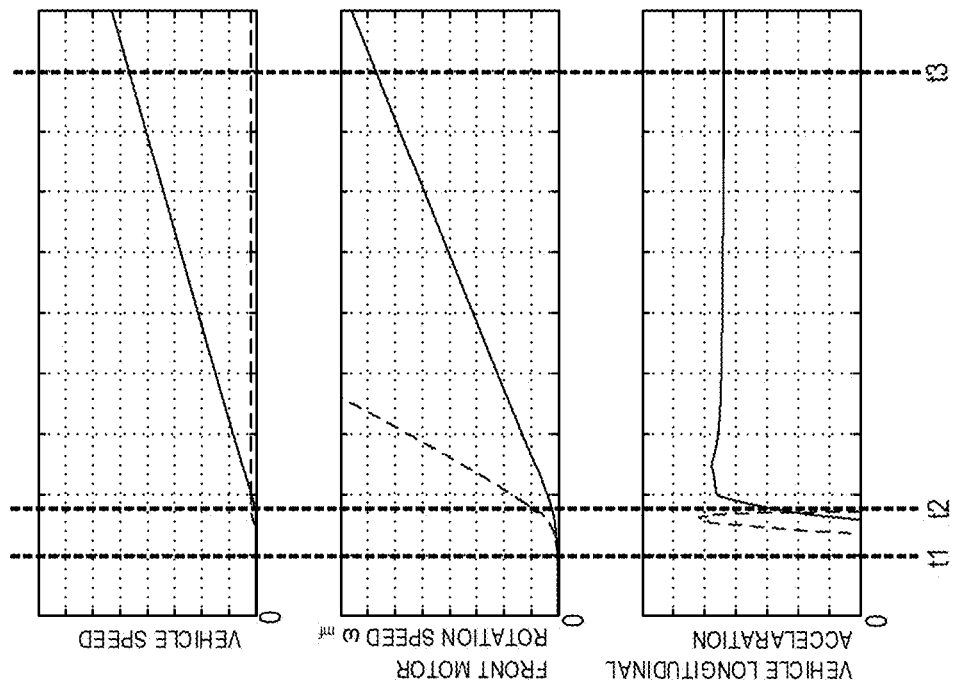
FIG. 17 illustrates the drive control of the electric vehicle according to the control method of this embodiment, and is a time chart when the accelerator is quickly depressed to start the electric vehicle from a stopped state.
Figure 17:
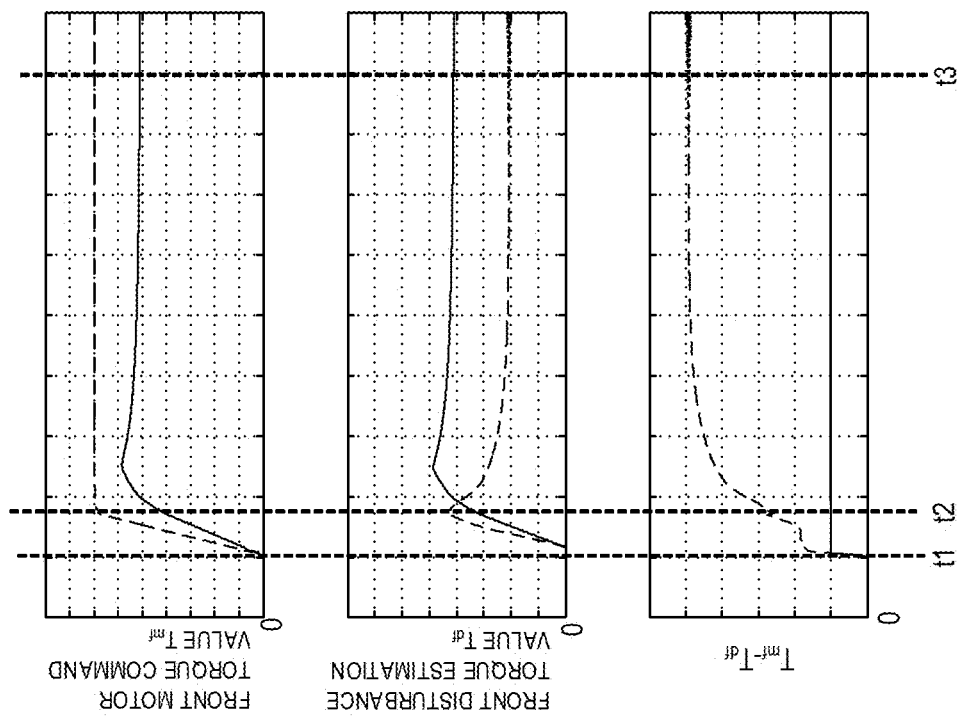

FIG. 17 illustrates the drive control of the electric vehicle according to the control method of this embodiment, and is a time chart when the accelerator is quickly depressed to start the electric vehicle from a stopped state. In FIG. 17, it is assumed that the accelerator is first depressed from the time t1 and the desired depression amount is reached between the time t1 and the time t2. Moreover, here, the description of the case of (C) above is omitted.

In the case of (A), when the accelerator is depressed sharply at t1, the front motor torque command value $T_{mf}$ increases sharply, but the front disturbance torque estimation value $T_{df}$ cannot follow this increase, and in the initial stage, $T_{mf}$-$T_{df}$ increases sharply. After that, even if the front disturbance torque estimation value $T_{df}$ increases, $T_{mf}$-$T_{df}$ continues to increase although the increase rate thereof decreases. Therefore, in the latter half of t1 to t2, the vehicle longitudinal acceleration increases sharply, and the vehicle speed and front motor rotation speed $\omega_{mf}$ also increase. However, when $T_{mf}$-$T_{df}$ exceeds a predetermined value, the slipping rate increases sharply, and thus, the vehicle longitudinal acceleration sharply decreases and becomes zero at the time t2.

At this time, the vehicle speed remains constant at a low speed, and when the traveling road surface is sand as described above, the vehicle speed immediately becomes zero and the front drive wheel 9f is stuck. Therefore, in FIG. 17, although not illustrated, from t2, the vehicle longitudinal acceleration once becomes negative and then converges to zero, and the vehicle speed remains zero.

At the time t2, the front motor torque command value $T_{mf}$ converges to a predetermined value based on the amount of depression of the accelerator, and remains that value even after t2. On the other hand, the front motor rotation speed $\omega_{mf}$ continues to increase even after t2, and the front disturbance torque estimation value $T_{df}$ decreases. Therefore, $T_{mf}$-$T_{df}$ increases as the front disturbance torque estimation value $T_{df}$ decreases.

In the case of (B), like in the case of (A), when the accelerator is sharply depressed at t1, $T_{mf}$-$T_{df}$ increases sharply. However, in (B), the front motor torque command value $T_{mf}$ is limited in a manner that $T_{mf}$-$T_{df}$ does not exceed the addition torque, and as shown in FIG. 17, has remained a constant value since the time slightly elapsed from the time t1. Therefore, the increasing speed of the front motor rotation speed $\omega_{mf}$ is lower than that of (A), and the front motor torque command value $T_{mf}$ also increases more slowly along with the increase of the front disturbance torque estimation value $T_{df}$ than in the case of (A).

Further, the addition torque is set in a manner that the slipping rate does not exceed the first predetermined value (for example, 20%). Thereby, the decrease of the front disturbance torque estimation value $T_{df}$ is suppressed, and the vehicle longitudinal acceleration can also remain a constant value. Thus, the vehicle speed can also be increased according to the vehicle longitudinal acceleration.

In this way, in a rapid depression operation of the accelerator by the driver, it is possible to limit the motor torque command value (front motor torque command value $T_{mf}$, rear motor torque command value $T_{mr}$) according to the road surface disturbance, and the front drive wheel 9f and rear drive wheel 9r (FIG. 1) can obtain the target acceleration without being stuck.

[When Entering a Road Surface with a Different Travelling Resistance During a Travel]

Figure 18:
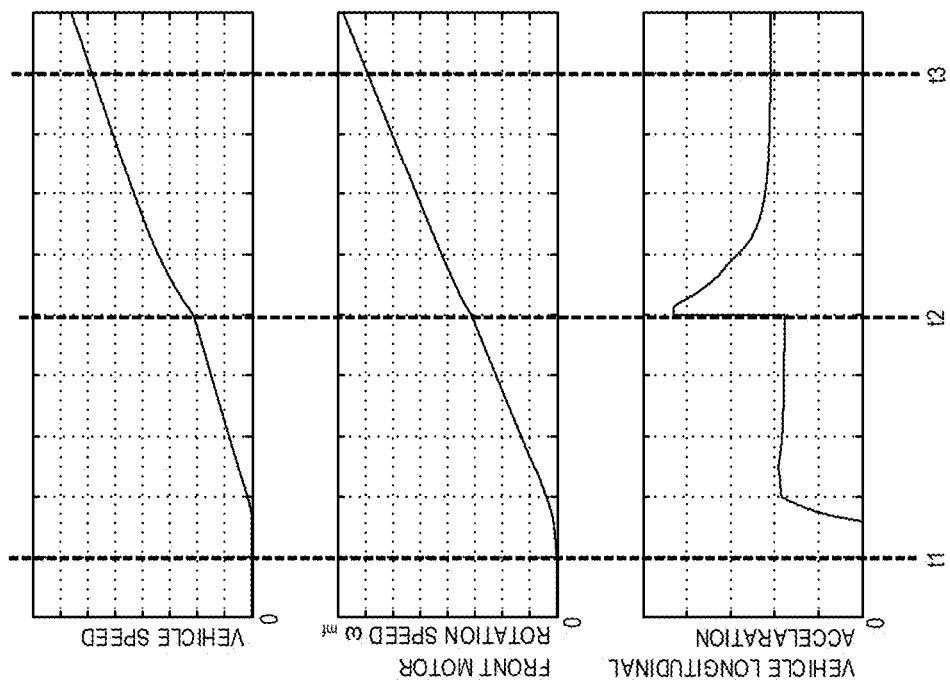
FIG. 18 illustrates the drive control of the electric vehicle according to the control method of this embodiment, and is a time chart when the electric vehicle enters an area with different travelling resistance during a travel.
Figure 18:
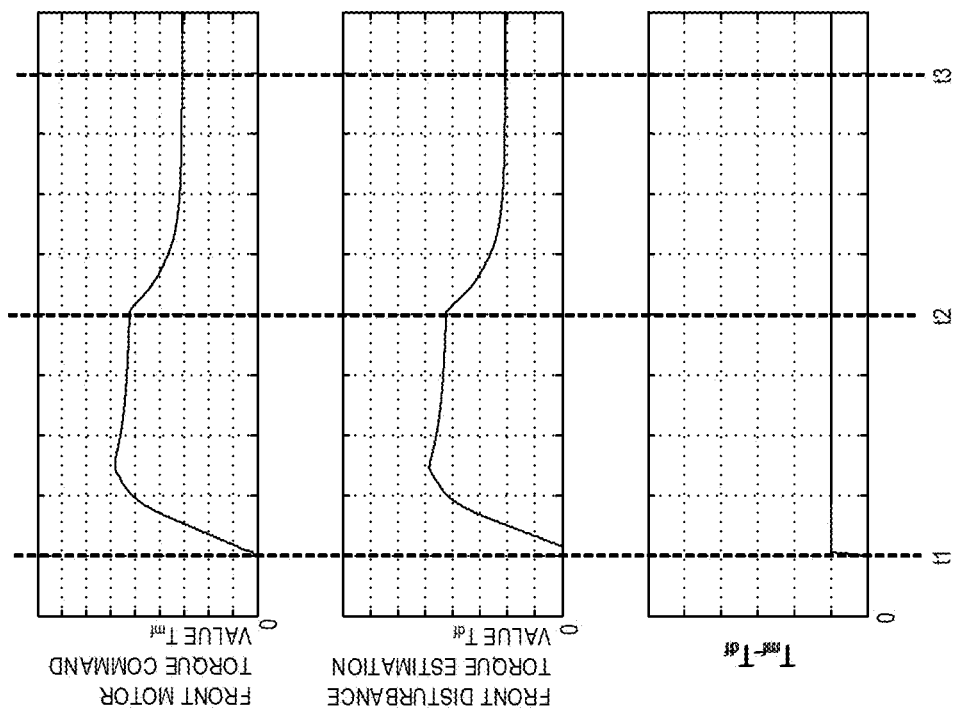

FIG. 18 illustrates the drive control of the electric vehicle according to the control method of this embodiment, and is a time chart when the electric vehicle enters an area with different travelling resistance during a travel. Here describes a case where the electric vehicle enters an area where the traveling resistance is small (for example, paved road) from an area where the traveling resistance is large (for example, sand) during a travel. In addition, the descriptions of the cases (A) and (C) above are omitted, and the description is made on the premise of the case (B).

When the driver depresses the accelerator at the time t1, the front motor torque command value $T_{mf}$ rises, but as mentioned above, the front motor torque command value $T_{mf}$ is limited in a manner that $T_{mf}$-$T_{df}$ does not exceed the addition torque. Thus, from the time t1 to the time t2, the front motor rotation speed $\omega_{mf}$ increases but the predetermined vehicle longitudinal acceleration is maintained, and the vehicle speed also increases corresponding to the longitudinal acceleration.

At the time t2, the electric vehicle enters an area where the traveling resistance is small (for example, paved road) from an area where the traveling resistance is large (for example, sand), and at that timing, the vehicle longitudinal acceleration increases step-functionally. However, from the time t2, the traveling resistance decreases, and thus, the front disturbance torque estimation value $T_{df}$ decreases and converges to a predetermined value. Further, as mentioned above, the front motor torque command value $T_{mf}$ is limited in a manner that $T_{mf}$-$T_{df}$ does not exceed the addition torque, and thus, from the time t2, the front motor torque command value $T_{mf}$ also decreases and converges to a predetermined value. Therefore, while the front motor rotation speed $\omega_{mf}$ continues to increase, the vehicle longitudinal acceleration decreases and converges to a predetermined value, and the sudden increase in the vehicle speed is also suppressed. As described above, the front motor torque command value $T_{mf}$ is controlled, and thus, smooth traveling with less impact is possible even when entering an area where the traveling resistance is different.

In this way, even in a situation where the traveling resistance changes, it is possible to limit the motor torque command value (front motor torque command value $T_{mf}$, rear motor torque command value $T_{mr}$) according to the road surface disturbance, and it is possible to suppress the over-rotation of the front drive wheel 9f and rear drive wheel 9r (FIG. 1) to obtain the target acceleration.

As described above, by applying the control method (control device) of the present invention to the electric vehicle, in the electric vehicle having the drive motor 4, acceleration control of the 4WD vehicle can be realized without using the vehicle body speed by setting the disturbance torque estimation value, which can be calculated, as the traveling resistance estimation value and limiting the motor torque according to the traveling resistance estimation value in the electric vehicle.

<First Modification>

Figure 19:
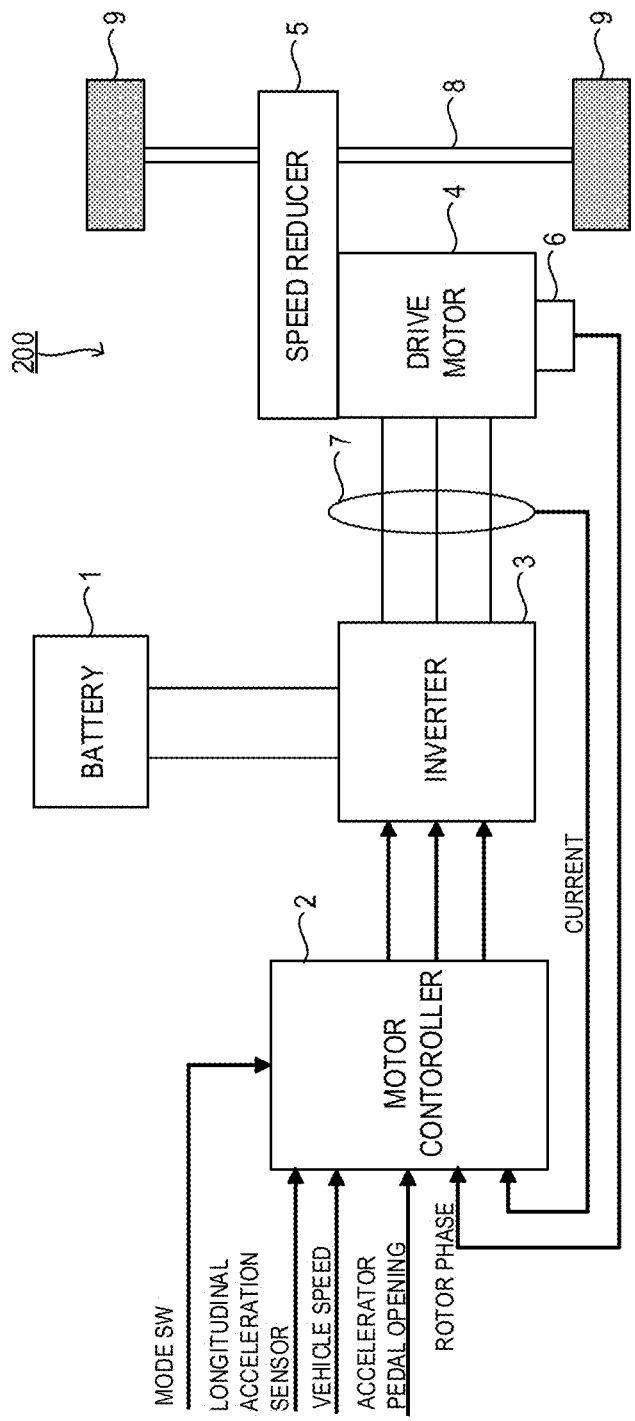
FIG. 19 is a diagram illustrating the configuration of the electric vehicle control system of the first modification.

FIG. 19 is a diagram illustrating the configuration of the electric vehicle control system 200 of the first modification. In the following description, the components similar to those of the above-described embodiment will be assigned the same numbers, and the description thereof will be omitted unless necessary.

As shown in FIG. 19, in the electric vehicle control system 200 of the first modification, unlike the above-described embodiment, there is one drive motor 4 and the front wheels or the rear wheels are the drive wheels 9. The electric vehicle control system 200 of the first modification will be mounted on a 2WD vehicle including two drive motors 4. The control method (control device) of the electric vehicle of the present invention is also applicable to the electric vehicle control system 200 of the first modification.

That is, when the drive wheels 9 are only the front drive wheels 9f (FIG. 1), in the disturbance torque estimation process, Step S602 (FIG. 6), Step S701A (FIG. 7), and Step S701B-Step S704B (FIG. 8) may be omitted. Further, in Step S703A, the filtering target is not the front motor torque command value $T_{mf}$ (previous value), but the first torque target value $T_{m1}$ (previous value) before distribution of the drive force shown in FIG. 4.

In the torque limitation process, Step S803, Step S805, Step S807, Step S809 (FIG. 9) and Step S1001, Step S1002B, Step S1003B (FIG. 12) may be omitted. Further, regarding the process of Step S801 (FIG. 9), the vehicle speed can be calculated from the rotation speed of the driven wheels on the rear side.

On the other hand, when the drive wheels 9 are only the rear drive wheels 9r (FIG. 1), in the disturbance torque estimation process, Step S601 (FIG. 6), Step S701A-Step S704A (FIG. 7), and Step S701B. (FIG. 8) may be omitted. Further, in Step S703B, the filtering target is not the front motor torque command value $T_{mf}$ (previous value), but the first torque target value $T_{m1}$ (previous value) before distribution of the drive force shown in FIG. 4.

In the torque limitation process, Step S802, Step S804, Step S806, Step S808 (FIG. 9) and Step S1001, Step S1002A, Step S1003A (FIG. 11) may be omitted. Further, regarding the process of Step S801 (FIG. 9), the vehicle speed can be calculated from the rotation speed of the driven wheels on the front side.

<Second Modification>

Figure 20:
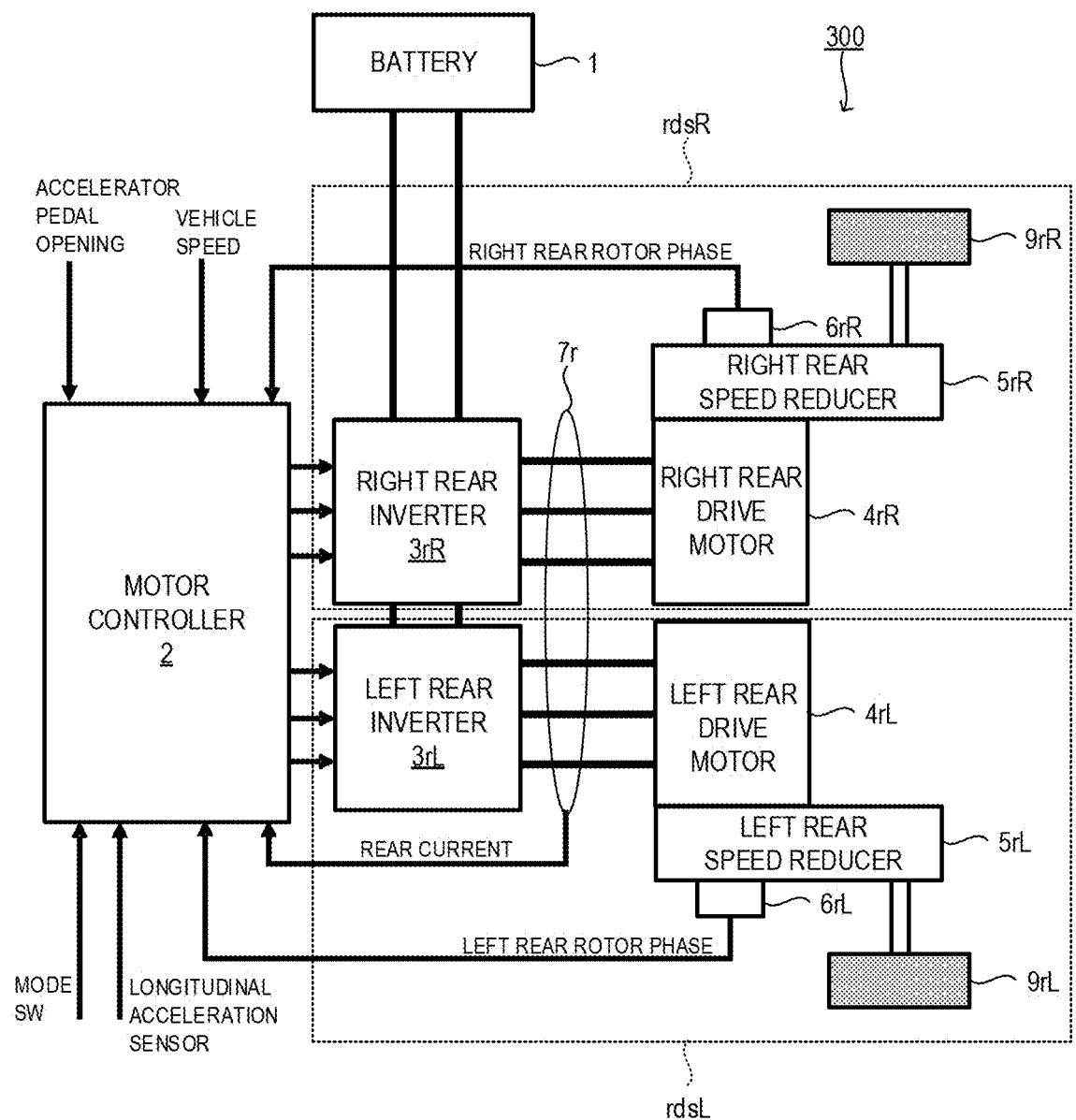
FIG. 20 is a diagram illustrating the configuration of the electric vehicle control system of the second modification.

FIG. 20 is a diagram illustrating the configuration of the electric vehicle control system 300 of the second modification. As shown in FIG. 20, in the electric vehicle control system 300 of the second modification, two drive motors 4 are arranged, however, the electric vehicle control system 300 does not include a front drive system fds, but includes a right rear drive system rdsR that drives the right rear drive wheel 9rR and a left rear drive system rdsL that drives the left rear drive wheel 9rL.

The right rear drive system rdsR includes a configuration in which the right rear drive motor 4rR can drive the right rear drive wheel 9rR via the right rear speed reducer 5rR, and further includes a right rear rotation sensor 6rR. The left rear drive system rdsL includes a configuration in which the left rear drive motor 4rL can drive the left rear drive wheel 9rL via the left rear speed reducer 5rL, and further includes a left rear rotation sensor 6rL.

In the electric vehicle control system 300 of the second modification, for example, the control method (control device) of the electric vehicle according to the present invention can be realized by replacing the parameters on the front drive system fds and rear drive system rds respectively with the parameters on the right rear drive system rdsR and left rear drive system rdsL and making modifications such as setting a suitable vehicle model in the aforementioned embodiment.

For example, it is possible to execute the control method (control device) of the electric vehicle according to the present invention by changing the parameters appropriately, such as replacing the front motor rotation speed $\omega_{mf}$ and rear motor rotation speed $\omega_{mr}$ respectively with the right rear motor rotation speed $\omega_{mrR}$ and left rear motor rotation speed $\omega_{mrL}$, replacing the front disturbance torque estimation value $T_{df}$ and rear disturbance torque estimation value $T_{dr}$ respectively with the right rear disturbance torque estimation value $T_{drR}$ and left rear disturbance torque estimation value $T_{drL}$, and replacing the front motor torque command value $T_{mf}$ and rear motor torque command value $T_{mr}$ respectively with the right rear motor torque command value $T_{mrR}$ and left rear motor torque command value $T_{mrL}$, in the aforementioned embodiment.

<Third Modification>

Figure 21:
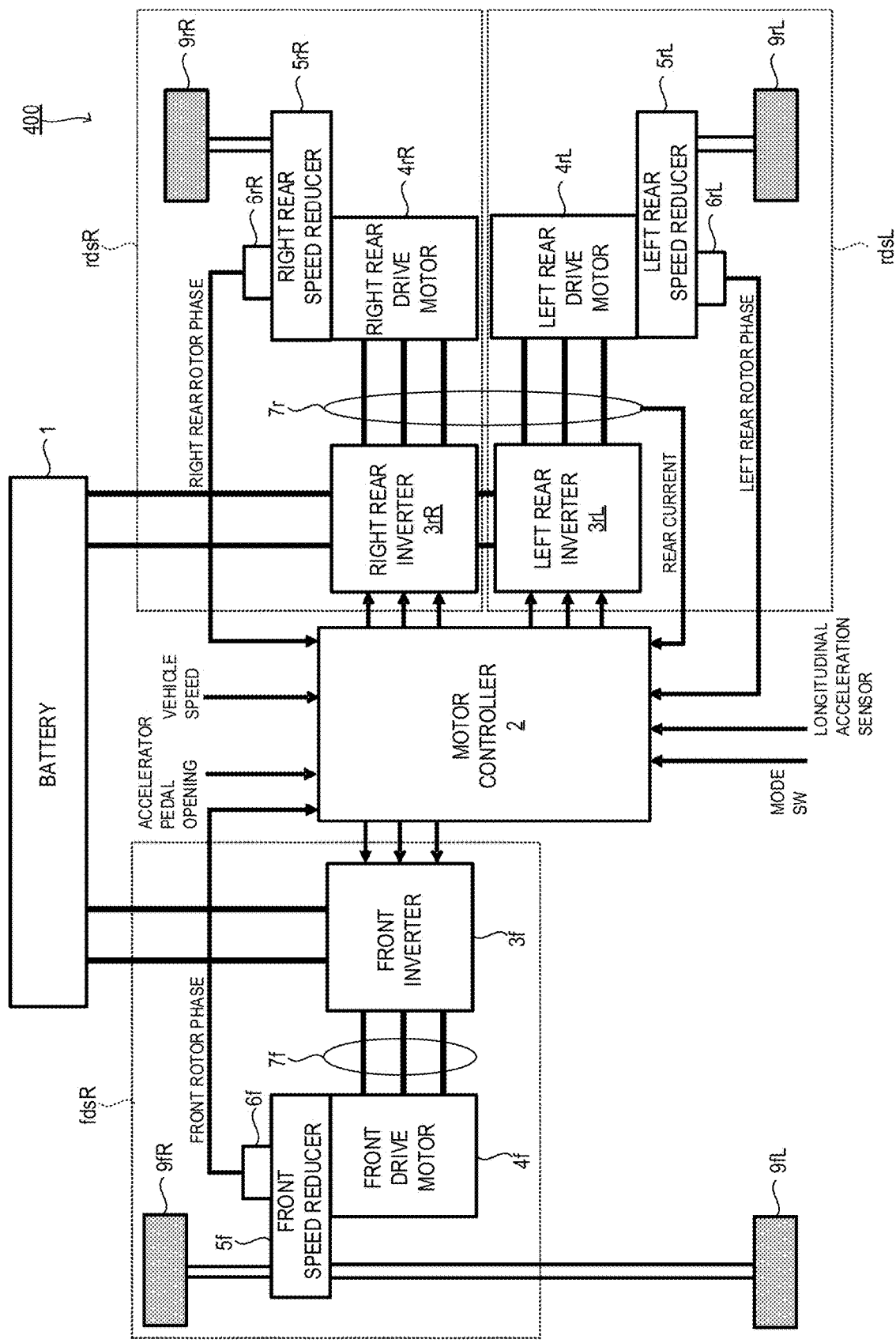
FIG. 21 is a diagram illustrating the configuration of the electric vehicle control system of the third modification.

FIG. 21 is a diagram illustrating the configuration of the electric vehicle control system 400 of the third modification. As shown in FIG. 21, the electric vehicle control system 400 of the third modification includes the front drive system fds, right rear drive system rdsR, and left rear drive motor 4rL. That is, the third modification includes the front drive motor 4f that drives the front drive shaft 8f, the right rear drive motor 4rR that drives the right rear drive wheel 9rR, and the left rear drive motor 4rL that drives the left rear drive wheel 9rL, a total of three drive motors 4. Particularly, the electric vehicle control system 400 of the third modification is mounted on a 4WD vehicle having a total of three drive motors 4.

In the electric vehicle control system 400 of the third modification, for example, the control method (control device) of the electric vehicle according to the present invention can be realized by setting an appropriate gain for distributing the parameters set in the rear drive system rds to the right rear drive system rdsR and left rear drive system rdsL (see FIG. 4) while executing the same control method as in the aforementioned embodiment.

<Fourth Modification>

Figure 22:
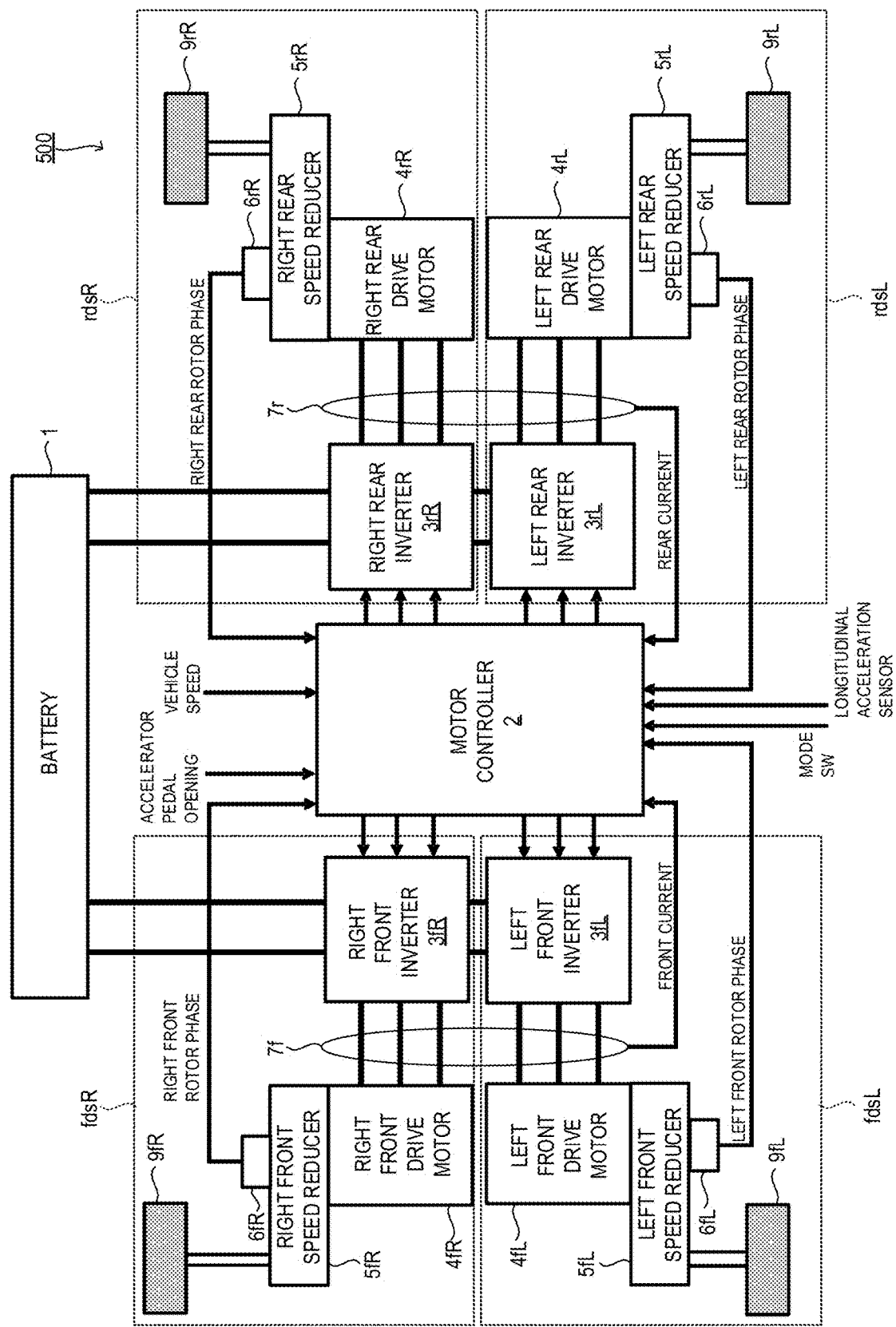
FIG. 22 is a diagram illustrating the configuration of the electric vehicle control system of the fourth modification.

FIG. 22 is a diagram illustrating the configuration of the electric vehicle control system 500 of the fourth modification. As shown in FIG. 22, the electric vehicle control system 500 of the fourth modification includes a right front drive system fdsR, left front drive system fdsL, right rear drive system rdsR, and left rear drive system rdsL, and is mounted on a 4WD vehicle having four drive motors 4.

The right front drive system fdsR includes a configuration in which the right front drive motor 4fR can drive the right front drive wheel 9fR via the right front speed reducer 5fR, and further includes a right front rotation sensor 6fR. The left front drive system fdsL includes a configuration in which the left front drive motor 4fL can drive the left front drive wheel 9fL via the left front speed reducer 5fL, and further includes a left front rotation sensor 6fL.

In the electric vehicle control system 500 of the fourth modification, for example, the control method (control device) of the electric vehicle according to the present invention can be realized by distributing each parameter of the front drive system fds to the right front drive system fdsR and left front drive system fdsL according to an appropriate distribution gain (see FIG. 4) while distributing each parameter of the rear drive system rds to the right rear drive system rdsR and left rear drive system rdsL according to an appropriate distribution gain (see FIG. 4) and meanwhile executing the same control method as in the aforementioned embodiment.

<Effect of this Embodiment>

According to the control method of the electric vehicle of this embodiment, the control method of the electric vehicle which uses one or a plurality of motors (drive motors 4) as the traveling drive source includes: a motor torque command value calculating step (executed by the motor controller 2) that calculates the motor torque command value (front motor torque command value $T_{mf}$, rear motor torque command value $T_{mr}$); an angular velocity detecting step (executed by the rotation sensor 6) that detects the angular velocity (front motor rotation speed $\omega_{mf}$, rear motor rotation speed $\omega_{mr}$) correlating with the rotation speed of the drive shaft which transmits the drive force of the motor (drive motor 4) to the drive wheel 9; a disturbance torque estimating step (executed by the motor controller 2) that estimates the disturbance torque (front disturbance torque estimation value $T_{df}$, rear disturbance torque estimation value $T_{dr}$) acting on the motor (drive motor 4) based on the motor torque command value and angular velocity; a limiting torque setting step (executed by the motor controller 2) that sets the limiting torque (front limiting torque $T_{rf}$, rear limiting torque $T_{rr}$) corresponding to the disturbance torque (front disturbance torque estimation value $T_{df}$, rear disturbance torque estimation value $T_{dr}$) in a manner that the slipping rate of the drive wheel 9 does not exceed the first predetermined value; and a motor torque limiting step (executed by the motor controller 2) that limits the motor torque command value (front motor torque command value $T_{mf}$, rear motor torque command value $T_{mr}$) using the limiting torque (front limiting torque $T_{rf}$, rear limiting torque $T_{rr}$).

In the aforementioned method, the first predetermined value, for example, is set in a manner that the slipping rate is between 10% and 20%. Further, the upper limit of the first predetermined value is a value where the slipping rate does not exceed a slipping rate (for example, 20%) near the peak value of the longitudinal frictional force in the characteristic curve showing the relation between the slipping rate of the drive wheel 9 and the longitudinal frictional force.

According to the aforementioned method, by limiting the motor torque command value determined by the driver's accelerator operation so that the slipping rate of the drive wheel 9 does not exceed the first predetermined value based on the disturbance torque estimation value according to the traveling resistance of the road surface, even if there is a mass balance variation, a tire contact load change, a change in the friction coefficient μ of road surface, a change in the gradient resistance, or a change in the traveling resistance due to sand, etc., the limiting torque can be set appropriately and the slip of the drive wheel 9 can be controlled appropriately. Therefore, it is possible to suppress over-rotation of the drive wheel 9, subsidence into sand, etc. (stuck), and acceleration failure.

According to this embodiment, in the limiting torque setting step (executed by the motor controller 2), the addition torque (accelerator pedal opening addition torque, front (rear) motor rotation speed addition torque) is added to the disturbance torque (front disturbance torque estimation value T df, rear disturbance torque estimation value $T_{dr}$) in a manner that the slipping rate of the drive wheel 9 does not exceed the first predetermined value. Thus, it is possible to suppress over-rotation of the drive wheel 9 to obtain the target acceleration and prevent subsidence into sand, etc.

In this embodiment, the addition torque is set in a manner that the addition torque increases as the accelerator pedal opening APO (accelerator depression amount) increases. Thus, by setting the addition torque to be larger according to the accelerator operation, it is possible to increase the acceleration of the electric vehicle and the slipping rate of the drive wheel 9 as intended while preventing the acceleration failure of the drive wheel 9 due to subsidence. Further, since a large acceleration can be obtained in proportion to the depression amount of the accelerator, it is possible to reduce the discomfort of acceleration when the driver operates the accelerator.

In this embodiment, the addition torque is set in a manner that the addition torque increases as the vehicle speed increases. When the electric vehicle starts from a stopped state in sand or deep snow, the drive wheel 9 tends to sink into sand or snow if the initial drive force is large. Therefore, in the low speed range, by setting the addition torque small and starting slowly, it is possible to prevent the subsidence of the drive wheel 9 at the time of starting.

In this embodiment, when a plurality of motors (front drive motor 4f, rear drive motor 4r) are arranged, the disturbance torques (front limiting torque $T_{rf}$, rear limiting torque $T_{rr}$) are estimated individually for the motors (front drive motor 4f, rear drive motor 4r), and the limiting torques (front limiting torque $T_{rf}$, rear limiting torque $T_{rr}$) are set individually for the motors (front drive motor 4f, rear drive motor 4r) based on the disturbance torques (front limiting torque $T_{rf}$, rear limiting torque $T_{rr}$). For an electric vehicle having two or more independent motors, it is possible to perform disturbance torque estimations independently using each motor rotation speed. Therefore, it is possible to independently and appropriately control the motor torque command value of each of the two or more motors.

In this embodiment, the motor torque limiting step (executed by the motor controller 2) is controlled to be turned on/off by the switch operation of the driver. In the switch operation, the driver's intention can be reflected in the control by determining that the limiting torque is valid.

According to this embodiment, in the motor torque limiting step (executed by the motor controller 2), when the gradient torque caused by the gradient of the road surface is estimated and the difference (Δd) between the disturbance torque (front disturbance torque estimation value $T_{df}$, rear disturbance torque estimation value $T_{dr}$) and the gradient torque is equal to or greater than the second predetermined value, the motor torque command value (front motor torque command value $T_{mf}$, rear motor torque command value $T_{mr}$) is limited using the limiting torque (front limiting torque $T_{rf}$, rear limiting torque $T_{rr}$). Thus, regarding the disturbance torque, it is possible to distinguish the gradient disturbance (gradient component of the disturbance torque) caused by the slope of the road surface from the traveling resistance disturbance (travelling resistance component of the disturbance torque) such as traveling resistance disturbance due to sand, and it is possible to limit the motor torque command value using the limiting torque when the traveling resistance disturbance is large with respect to the gradient disturbance.

Further, according to the control device of the electric vehicle of this embodiment, the control device of the electric vehicle which uses one or a plurality of motors (drive motors 4) as the traveling drive source includes: a motor torque command value calculating means (motor controller 2) configured to calculate the motor torque command value (front motor torque command value $T_{mf}$, rear motor torque command value $T_{mr}$); an angular velocity detecting means (rotation sensor 6) configured to detect the angular velocity (front motor rotation speed $\omega_{mf}$, rear motor rotation speed $\omega_{mr}$) correlating with the rotation speed of the drive shaft which transmits the drive force of the motor (drive motor 4) to the drive wheel 9; a disturbance torque estimating means (motor controller 2) configured to estimate the disturbance torque (front disturbance torque estimation value $T_{df}$, rear disturbance torque estimation value $T_{dr}$) acting on the motor (drive motor 4) based on the motor torque command value (front motor torque command value $T_{mf}$, rear motor torque command value $T_{mr}$) and angular velocity; a limiting torque setting means (motor controller 2) configured to set the limiting torque (front limiting torque $T_{rf}$, rear limiting torque $T_{rr}$) corresponding to the disturbance torque (front disturbance torque estimation value $T_{df}$, rear disturbance torque estimation value $T_{dr}$) in a manner that the slipping rate of the drive wheel 9 does not exceed the first predetermined value; and a motor torque limiting means (motor controller 2) configured to limit the motor torque command value (front motor torque command value $T_{mf}$, rear motor torque command value T mr) using the limiting torque (front limiting torque $T_{rf}$, rear limiting torque $T_{rr}$).

In the aforementioned configuration, the first predetermined value, for example, is set in a manner that the slipping rate is between 10% and 20%. Further, the upper limit of the first predetermined value is a value where the slipping rate does not exceed a slipping rate (for example, 20%) near the peak value of the longitudinal frictional force in the characteristic curve showing the relation between the slipping rate of the drive wheel 9 and the longitudinal frictional force.

According to the aforementioned configuration, by limiting the motor torque command value determined by the driver's accelerator operation using the disturbance torque estimation value according to the traveling resistance of the road surface, even if there is a mass balance variation, a tire contact load change, a change in the friction coefficient μ of road surface, a change in the gradient resistance, or a change in the traveling resistance due to sand, etc., the limiting torque can be set appropriately and the slip of the drive wheel 9 can be controlled appropriately. Therefore, it is possible to suppress over-rotation of the drive wheel 9, subsidence into sand, etc. (stuck), and acceleration failure.

While the embodiments of the present invention have been described above, the configurations described in the aforementioned embodiments and modifications only show part of application examples of the present invention and are not intended to limit the technical scope of the present invention.

For example, each vehicle model assumed in the aforementioned embodiments and each parameter determined by the vehicle model can be arbitrarily changed as long as the technical idea of the present invention, particularly the idea of calculating the disturbance torque estimation value and the limiting torque, can be realized.

Further, in each of the aforementioned embodiments and modifications, "right" and "left" are merely identifications of directions used for convenience of description, and are not intended to exactly match the left-right direction with respect to the front of the vehicle body.

The invention claimed is:

1. A control method of an electric vehicle using one or a plurality of motors as a traveling drive source, comprising:
   a motor torque command value calculating step comprising calculating a motor torque command value;
   an angular velocity detecting step comprising detecting an angular velocity correlating with a rotation speed of a drive shaft which transmits a drive force of the motor to a drive wheel;
   a disturbance torque estimating step comprising estimating a disturbance torque acting on the motor according to a difference between a first motor torque estimation value based on the angular velocity and a second motor torque estimation value based on the motor torque command value;
   a limiting torque setting step comprising setting a limiting torque corresponding to the disturbance torque in a manner that a slipping rate of the drive wheel does not exceed a first predetermined value; and
   a motor torque limiting step comprising limiting the motor torque command value using the limiting torque.

2. The control method of the electric vehicle according to claim 1, wherein
   an addition torque is added to the disturbance torque in a manner that the slipping rate of the drive wheel does not exceed the first predetermined value in the limiting torque setting step.

3. The control method of the electric vehicle according to claim 2, wherein
   the addition torque is set in a manner that the addition torque increases as an accelerator pedal opening increases.

4. The control method of the electric vehicle according to claim 2, wherein
   the addition torque is set in a manner that the addition torque increases as a vehicle speed increases.

5. The control method of the electric vehicle according to claim 1, wherein
   when a plurality of the motors are arranged,
   the disturbance torque is estimated individually for each of the motors, and the limiting torque is set individually for each of the motors based on the disturbance torque.

6. The control method of the electric vehicle according to claim 1, wherein
   the motor torque limiting step is controlled to be turned on and off by a switch operation of a driver.

7. The control method of the electric vehicle according to claim 1, wherein
   in the motor torque limiting step, when a gradient torque caused by a gradient of a road surface is estimated and a difference between the disturbance torque and the gradient torque is equal to or greater than a second predetermined value, the motor torque command value is limited using the limiting torque.

8. A control device of an electric vehicle using one or a plurality of motors as a traveling drive source, comprising a controller programmed to:
   calculate a motor torque command value;
   detect an angular velocity correlating with a rotation speed of a drive shaft which transmits a drive force of the motor to a drive wheel;
   estimate a disturbance torque acting on the motor according to a difference between a first motor torque estimation value based on the angular velocity and a second motor torque estimation value based on the motor torque command value;
   set a limiting torque corresponding to the disturbance torque in a manner that a slipping rate of the drive wheel does not exceed a first predetermined value; and
   limit the motor torque command value using the limiting torque.

* * * * *